United States Patent
Sagae et al.

[11] Patent Number: 6,048,817
[45] Date of Patent: Apr. 11, 2000

[54] POLYMERIZATION OF OLEFINS

[75] Inventors: Takehiro Sagae; Yumito Uehara, both of Yokkaichi, Japan

[73] Assignee: Mitsubishi Chemical Corporation, Tokyo-To, Japan

[21] Appl. No.: 09/065,464

[22] Filed: Apr. 24, 1998

[30] Foreign Application Priority Data

| | | | |
|---|---|---|---|
| Apr. 25, 1997 | [JP] | Japan | 9-109173 |
| Nov. 14, 1997 | [JP] | Japan | 9-313102 |
| Nov. 14, 1997 | [JP] | Japan | 9-313103 |
| Nov. 14, 1997 | [JP] | Japan | 9-313104 |

[51] Int. Cl.$^7$ ................................. B01J 31/00
[52] U.S. Cl. ............... 502/117; 502/80; 502/84; 502/102; 502/103; 502/117; 502/118; 502/104; 502/109
[58] Field of Search ............... 502/80, 84, 102, 502/103, 117, 118, 104, 109

[56] References Cited

U.S. PATENT DOCUMENTS 5,399,636  3/1995  Alt et al. .................. 526/129
5,830,820  11/1998  Yano et al. ................ 502/62

FOREIGN PATENT DOCUMENTS 0 511 665  11/1992  European Pat. Off. .
0 683 180  11/1995  European Pat. Off. .

OTHER PUBLICATIONS

Jonathan Tudor, et al., Chemical Communications, No. 17, pp. 2031–2032, "Intercalation of Catalytically Active Metal Complexes in Phyllosilicates and Their Application as Propene Polymerisation Catalysts", 1996 No month available.

*Primary Examiner*—Elizabeth D. Wood
*Attorney, Agent, or Firm*—Oblon, Spivak, McClelland, Maier & Neustadt, P.C.

[57] ABSTRACT

A particulate phyllosilicate mixture comprising a mixture containing a phyllosilicte belonging to the smectite group and a phyllosilicate belogning to the mica group, the phyllosilicate particle having a content of the phyllosilicate belonging to the smectite group of 0.1 to 50% by weight and optionally satisfying the following requirements (a) to (c):

(a): the average particle diameter is 20 to 1000 $\mu$m with not more than 20% of the total number of particles being accounted for by particles having a particle diameter of not more than 10 $\mu$m;

(b): the crushing strength of the particle is not less than 0.5 MPa as measured with a microcompression tester and (c): the bulk density of the particle of not less than 0.6 g/cm$^3$.

Polymerization of olefins with catalyst comprising the particulate phyllosilicate mixture as a carrier or support for the catalysts is also disclosed.

11 Claims, No Drawings

POLYMERIZATION OF OLEFINS

BACKGROUND OF THE INVENTION

1. Field of the Invention

The present invention relates to a particulate phyllosilicate mixture and use thereof. The particles of phyllosilicate mixture of the present invention possess excellent mechanical strength and abrasion resistance, permit creation of unfavorable phenomena impedimental to reactions and stable operations, such avoiding crumbling or powdering of particles, and in addition have excellent fluidity. Therefore, the particulate phyllosilicate mixture of the present invention is suitable as a catalytic component or as a catalyst.

Phyllosilicates have been extensively used as components for various catalysts or as catalysts per se, as additives for plastics, paints and the like, and, by virtue of excellent feel in use and feel to the hand, as additives for cosmetics and pharmaceuticals. In particular, in many cases, they have been used as a catalytic component or a catalyst for petroleum refining, various chemical reactions, including oxidation/reduction, hydrogenation, dehydrogenation, and alkylation, and polymerization of olefins on a commercial scale.

In general, in a reaction system utilizing a catalyst, for any of a gaseous phase and a liquid phase, the so-called "heterogeneous catalytic reaction" mainly takes place, and it is common practice to carry out the reaction in a fixed bed, a moving bed, a spouted bed, a suspended bed or the like. For this reason, for most of the catalysts used, shaping into particles is carried out from the viewpoint of improving the flow of the sting materials and/or the reaction products and the transfer of materials and heat, or alternatively a particulate carrier is prepared followed by supporting of a material, which is to serve as a catalyst, a co-catalyst or the like on the carrier. The particulate phyllosilicate mixture according to the present invention is particularly preferred as the above catalytic component or catalyst.

2. Background Art

In general, phyllosilicates, for both natural and synthetic products, when used in a powder form, are mechanically ground to a powder. Most of them have an irregular particle shape and a small bulk density, contain a large amount of fine powder, and have a wide particle size distribution. Phyllosilicates having such shape and powder properties, when used as a catalytic component or a catalyst, are likely to have poor fluidity, poor productivity, and render stable operation difficult due to the presence of the fine powder or the like, so far as the present inventors know.

Conventional methods for improving the shape of the above phyllosilicate include, for example, one which comprises dispersing a water-swellable clay mineral in water and spray-drying the dispersion to prepare granules (Japanese Patent Laid-Open No. 50311/1988), one wherein finely divided mica is heated at the melting temperature and then recrystallized (Japanese Patent Laid-Open No. 263431/1994), and one wherein acid-treated smectite clay is mixed and aggregated to prepare granules (Japanese Patent Laid-Open No. 263421/1994).

Among the above methods, the method using spray drying can simply provide a spherical powder having even particle diameters. This method, however, suffers from the following problems. Specifically, when the concentration of the aqueous dispersion of the water-swellable clay mineral is increased in order to improve the profitability, the viscosity of the slurry is increased to create clogging of nozzles or poor shape. On the other hand, when the concentration of the aqueous dispersion of the water-swellable clay mineral is decreased in order to maintain good viscosity of the slurry, only particles having a small diameter can be prepared, resulting in unsatisfactory productivity.

On the other hand, it has been known that olefins are polymerized with catalysts based on (1) a metallocene compound combined with (2) an aluminoxane as disclosed in Japanese Patent Publication (which will be referred to herein as "Japanese Kokoku") No. 12283/1992, Japanese Patent Laid-Open Publication (which will be referred to herein as "Japanese Kokai") Nos. 19309/1988, 35007/1985 and 167307/1990. The polymerizations with these catalysts have advantages over those obtainable when conventional Ziegler-Natta catalysts are used in that a very high catalyst activity per the transition metal used and polymers having sharp molecular weight distribution and compositional distribution are obtainable.

However, these catalysts are often soluble in the polymerization system, and this feature may sometimes result in process problems such that the olefin polymers obtained by slurry polymerization or vapor/gas phase polymerization in a particulate form may sometimes have poor granulometric characteristics such as an irregular form of granules, lower bulk densities and higher contents of fines. Furthermore, since these catalysts require higher amount of aluminoxanes when commercially acceptable catalyst activities are required, whereby the activities per the aluminum used are low thus entailing economical problems and necessity of removal of the catalyst residues from the polymers produced.

Some improvements have been proposed to solve these problems. For instance, it is proposed to support one or both of the transition metal compound and the organoaluminum compound on an inorganic oxide such as silica or alumina or on an organic material thereby conduct polymerization of olefins thereover. See Japanese Kokai No. 35007/1985, No. 135408/1985, No. 31404/1986, No. 108610/1986, No. 276805/1986, No. 296008/1986, No. 101303/1989, No. 207303/1989, No. 74412/1991, No. 74415/1991, No. 234709/1991 and No. 501869/1981 (PCT). It is also proposed to subject the supported catalysts to preliminary polymerization. See Japanese Kokai No 234710/1991.

These prior proposals would still entail some problems such that the polymers so produced contain fines or granules of a larger size and have low bulk densities and that the polymerization activities per the solid component of the catalysts are low. Other improvements have also been proposed such that use as catalysts is made of metallocene compounds and aluminoxanes supported on the smectite (Japanese Kokai No. 25214/1993) and use as polymerization catalysts of metallocene compounds, phylloclay minerals which have undergone treatment with metal oxides or precursors to metal oxides followed by calcination and organic aluminoxanes (Japanese Kokai No. 33814/1995).

These improvements proposed may produce satisfactory catalyst activities per the aluminum used, but some problems may still remain unsolved in commercial operation such as crushing of particles or formation of fines depending on the polymerization conditions employed resulting in the lowering in the bulk density of the polymer powder or in the lowering in the fluidity in the vapor phase polymerization. The formation of fines may sometimes cause adhesion of the polymers to or sheeting on the polymerization vessel walls, or cause the clogging within pipings or heat-exchangers used whereby stable operation may sometimes be hindered.

The improvements proposed by the present inventors referred to hereinabove to the granulation of phyllosilicates as disclosed in Japanese Kokai Nos. 301917/1993 and 228621/1995 would not always be fully satisfactory when the phyllosilicates so granulated are used as catalyst supports as referred to hereinabove.

In order to solve the above problems, the present inventors ever granulated the phyllosilicate which had been treated under the specific requirements. As a result, the resultant particles had good powder properties, that is, contained no significant amount of fine powder and coarse particles and had high bulk density (Japanese Patent Laid-Open Nos. 301917/1993 and 228621/1995). However, when a phyllosilicate, which is flaky and has a relatively large particle diameter, such as a phyllosilicate belonging to the mica group is used, even though it could be successfully granulated, the resultant particles often have small bulk density and unsatisfactory strength. Therefore, the particles prepared by the above modified method, when used as a catalyst carrier, is not always satisfactory in the productivity of a contemplated polymer, creation of a fine powder and the like.

SUMMARY OF THE INVENTION

The present invention aims to solve the above problems of the prior art and is based on such finding that use of a predetermined mixture of a plurality of types of phyllosilicates having different properties can provide particulate phyllosilicate mixtures having good power properties, that is, high strength and bulk density.

Further, the present invention is based on the discovery that the use as catalyst supports of such phyllosilicates produces in high productivities olefin polymers which are improved in mechanical strengths and wear resistances and which as granules are improved in flowing characteristics and resistant to disintegration to or formation of fines which may hinder stable operation of polymerization.

The present invention, accordingly, relates, in one aspect thereof, a catalyst component for polymerizing olefins which comprises:

Component (A) which is a metallocene compound of a transition metal; and

Component (B) which is a particulate phyllosilicate mixture comprising a phyllosilicate of the smectite group and a phyllosilicate of the mica group, the former comprising 0.1 to 50% by weight of the phyllosilicate mixture.

The present invention, in another aspect thereof, presents a catalyst for polymerizing olefins which comprises the catalyst component for polymerizing olefins comprising the Components (A) and (B) given above and a Component (C) which is an organoaluminum compound.

The present invention, in still another aspect, presents a process for polymerizing olefins which comprises contacting an olefin with a catalyst comprising Components (A), (B) and (C) that is optional.

The present invention, in further aspect thereof, presents a particulate phyllosilicate mixture which comprises a phyllosilicate of the smectite group and a phyllosilicate of the mica group, the former comprising 1 to 50% by weight of the phyllosilicate mixture and which meets the requirements of (a) to (c):

(a): the average particle diameter of 20 to 1000 $\mu$m, with not more than 20% of the total number of particles being accounted for by particles having a particle diameter of not more than 10 $\mu$m;

(b): the crushing strength of the particle of not less than 0.5 MPa as measured with a microcompression tester; and (c): the bulk density of the particulate mixture of not less than 0.6 g/cm$^3$.

According to the present invention, to begin with, particulate phyllosilicate mixtures can be provided which have excellent powder properties, that is, have an even particle diameter, high strength, and high bulk density and contain no significant amount of fine powder or coarse particles. The particulate phyllosilicate mixture can be used in various applications, for example, as a catalyst component which, particularly when used on a commercial scale, is particularly useful in chemical reactions typified by polymerization of olefins. Utilization of the particulate phyllosilicate mixture having the above excellent properties according to the present invention can provide a catalyst having good fluidity, an olefin polymer, which contains no significant amount of a fine powder and coarse particles and has high bulk density, and a process for producing an olefin polymer which is good in reaction product and transfer of heat.

PREFERRED EMBODIMENTS OF THE INVENTION

The present invention depends basically on the unique nature of the particulate phyllosilicate mixtures.

1. Particulate phyllosilicate mixture

<General description>

The particulate phyllosilicate mixture of the present invention is a mixture comprising a phyllosilicate belonging to the smectite group and a phyllosilicate belonging to the mica group, the particulate phyllosilicate mixture having a content of the phyllosilicate belonging to the smectite group of 0.1 to 50% by weight. The term "comprising" means, as is understood as a conventional patent term, not only a mixture consisting of a phyllosilicate belonging to the smectite group and a phyllosilicate belonging to the mica group alone (that is, a mixture consisting of 0.1 to 50% by weight of a phyllosilicate belonging to the smectite group and 50 to 99.9% by weight of a phyllosilicate belonging to the mica group) but also a mixture comprising, in addition to the phyllosilicate belonging to the smectite group and the phyllosilicate belonging to the mica group, a suitable or unavoidable component(s) in a minor amount, for example, in an amount of about 0.1 to 30% by weight based on the phyllosilicate belonging to both the groups.

Preferably, the particulate phyllosilicate mixture according to the present invention simultaneously satisfies, in addition to the above requirement, specific requirements (a) to (c).

The requirement (a) is a requirement for the average particle diameter and the proportion of particles having a diameter of not more than 10 $\mu$m in the particulate phyllosilicate mixture according to the present invention. Specifically, the average particle diameter should be 20 to 1000 $\mu$m, and the number of particles having a particle diameter of not more than 10 $\mu$m is not more than 20% based on the total number of the particles. According to the present invention, the average particle diameter is preferably 20 to 500 $\mu$m, particularly preferably 20 to 100 $\mu$m, and preferably not more than 15%, particularly preferably not more than 10%, of the total number of the particles is taken accounted for by particles having a diameter of not more than 10 $\mu$m. The requirement (a) is preferably such that both the above preferred requirements for the average particle diameter and the amount of the particles having a diameter of not more than 10 $\mu$m present are preferably satisfied.

In this case, the measurement of the particles was carried out by means of a particle size distribution measuring apparatus utilizing laser diffractometry ("LMS-24," light source: semiconductor laser (wavelength 670 nm)) manufactured by SEISHIN ENTERPRISE CO., LTD. In the measurement, ethanol was used as a dispersing medium, and the particle diameter distribution and the average particle diameter were determined with the refractive index and the shape factor being respectively 1.33 and 1.0.

The requirement (b) is a requirement for the strength of the phyllosilicate particles of the present invention, specifically such that the crushing strength of the particle is not less than 0.5 MPa as measured with a microcompression tester. The requirement (b) in the present invention is preferably such that the crushing strength is not less than 1.0 MPa. The upper limit is about 40 MPa.

The crushing strength is a value determined by measuring the crushing strength of any 10 particles or more by means of a microcompression tester "MCTM-500," manufactured by Shimadzu Seisakusho Ltd. and calculating the average value, of the measurements, as the crushing strength.

The requirement (c) is for the bulk density of the phyllosilicate particles according to the present invention. More specifically, the bulk density should be not less than 0.6 g/cm$^3$, preferably not less than 0.7 g/cm$^3$. The upper limit of the bulk density is about 1.5 g/cm$^3$.

<Phyllosilicate belonging to smectite group>

The phyllosilicate belonging to the smectite group used in the particulate phyllosilicate mixture of the present invention is a phyllosilicate belonging to the smectite group among phyllosilicates having a 2:1 layer structure. Representative examples of the phyllosilicate belonging to the smectite group include montmorillonite, beidellite, saponite, nontronite, hectorite, and sauconite. In the present inventions any of natural products and synthetic products may be used. Commercially available products, such as "Kunipia" and "Sumecton" (both products being manufactured by Kunimine Industries Co., Ltd.), "Montmorllonite K10" (manufactured by Aldrich and Suedchemie), and "K-Catalysts series" (manufactured by Suedchemie), may also be used. In the practice of the present invention, they may be used alone or as a mixture of two or more.

If necessary, the phyllosilicate belonging to the smectite group may be ground. When the contemplated particulate phyllosilicate mixture according to the present invention is produced, for example, through a slurry state (described below in detail), the grinding treatment permits the phyllosilicate belonging to the smectite group to be highly dispersed in a slurry dispersing medium. Therefore, in the production of the particulate phyllosilicate mixture by the above method, preferably, the phyllosilicate belonging to the smectite group is ground. In this case, grinding methods are not particularly limited, and grinding utilizing collision of particles against one another by means of a high-speed gas stream or grinding utilizing collision of particles against the wall of a grinding device is one method which can be easily practiced on a commercial scale. Specific devices usable herein include jet mills and single track mills. The size of the particles after the grinding is preferably 0.01 to 50 µm, particularly preferably 0.01 to 30 µm. It is needless to say that the particle diameter and the particle diameter distribution of the particulate phyllosilicate mixture belonging to the smectite group after the grinding, when brought to the particulate phyllosilicate mixture of the present invention, satisfy the above requirement (a).

<Phyllosilicate belonging to mica group>

The phyllosilicate, belonging to the mica group, used to prepare the particulate phyllosilicate mixture of the present invention is a phyllosilicate, belonging to the mica group, having a 2:1 type layer structure. Representative examples thereof include commonmica, palagonite, phlogopite, biotite, and lepidolite. In the present invention, any of natural products and synthetic products may be used. "Synthetic mica Somasif" (manufactured by CO-OP CHEMICAL CO., LTD.), "Fluorophlogopite," "Tetrasilicon Fluoride Mica," and "Teniolite" (all the above products being manufactured by Topy Industries, Ltd.) and the like, which are commercial products, are representative preferred examples of the phyllosilicate belonging to the mica group. In the present invention, they may be used alone or as a mixture of two or more.

DETAILED DESCRIPTION

The particulate phyllosilicate mixture according to the present invention is a mixture containing the phyllosilicate belonging to the mica group and the phyllosilicate belonging to the smectite group. The content of the phyllosilicate belonging to the smectite group is 0.1 to 50% by weight, preferably 0.5 to 40% by weight, particularly preferably 1 to 30% by weight. When the content of the phyllosilicate belonging to the smectite group is lower than the above range, the crushing strength or the bulk density is unfavorably lowered. On the other hand, when it is higher than the above range, the viscosity of the water slurry in the production of the particulate phyllosilicate mixture by spray granulation is so high that clogging of the nozzle and other unfavorable phenomena occur. When the content is lowered in order to render the viscosity of the slurry suitable, the average particle diameter becomes so small that the requirement (a) may not be satisfied.

In the present invention, both the phyllosilicate belonging to the smectite group and the phyllosilicate belonging to the mica group are preferably ion-exchangeable (or swellable). In this case, the term "ion-exchangeable" means that the intercalated cation of the phyllosilicate is exchangeable. The term "swellable" means that water molecules are incorporated into between layers of the phyllosilicate when it is present together with water, causing the bottom-to-bottom spacing to be increased. The degree of the increase in bottom-to-bottom spacing is at least 1.2 times, preferably at least 1.5 times. The term "phyllo-" means the material has a layer structure.

In general, the natural product is in many cases not ion-exchangeable (not swellable), and, in this case, in order to render the natural product ion-exchangeable (or swellable), which is a preferred embodiment, it is preferred to carry out treatment for imparting the ion-exchanging or swelling property. The following chemical treatment is particularly preferred for the above purpose.

Preferably, the above two types of silicates are those chemically treated. In this case, the chemical treatment may be any of surface treatment for removing impurities deposited on the surface and treatment which influences the crystal structure and the chemical composition of the phyllosilicate. Examples of the treatment usable herein include (i) acid treatment, (ii) alkali treatment, (iii) salt treatment, and (iv) organic treatment. These treatments remove impurities present on the surface, exchange intercalated cation, and elute cations of aluminum, silicon, magnesium and the like in the crystal structure. As a result, an ion composite, a molecule composite, an organic composite and the like are formed to vary the surface area, the layer-to-layer spacing, the solid acidity and the like. These treatments may be carried out alone or in combination of two or more. When the ion-exchangeability (or swellability) is imparted or improved in one of or both the silicates as a result of the "chemical treatment", the "chemical treatment" can be regarded as the "treatment for imparting the "ion-exchanging (or swelling) property." These chemical treatments may be applied to any one of or both the phyllosilicate belonging to the smectite group and the phyllosilicate belonging to the mica group before mixing of both the phyllosilicates or alternatively may be applied to both the phyllosilicates after the mixing.

Acids (i) usable in the chemical treatment include suitable inorganic acids or organic acids, and preferred examples thereof include hydrochloric acid, sulfuric acid, nitric acid, acetic acid, and oxalic acid. Alkalis (ii) usable in the chemical treatment include NaOH, KOH, and $NH_3$. Salts (iii) usable in the chemical treatment are preferably a compound comprising a cation, containing at least one atom selected from the group consisting of the Groups 2 to 14 atoms, and at least one anion selected from the group consisting of anions derived from halogen atoms or inorganic or organic acids. More preferred is a salt comprising a cation derived from aluminum, magnesium, titanium, zirconium, hafnium, chromium, zinc, tin, copper, nickel, iron, niobium, or thallium and an anion derived from Cl, $SO_4$, $NO_3$, OH, $C_2H_4$, or $PO_4$. Organic materials (iv) usable in the chemical treatment include alcohols (aliphatic alcohols having 1 to 4 carbon atoms, preferably, for example, methanol, ethanol, propanol, ethylene glycol, glycerin, and aromatic alcohols having 6 to 8 carbon atoms, preferably, for example, phenol) and higher hydrocarbons (hydrocarbons having 5 to 10 carbon atoms, preferably 5 to 8 carbon atoms, preferably, for example, hexane and heptane). Other preferred examples thereof include formamide, hydrazine, dimethylsulfoxide, N-methylformamide, and N,N-dimethylanilide. In this case, the Periodic Table of atoms is based on a 18-group system recommended by IUPAC in 1989.

When the particulate phyllosilicate mixture does not simultaneously satisfy the requirements (a) to (c), or in order to bring the particulate phyllosilicate mixture into a more preferred form even though the above requirements are simultaneously satisfied, the properties of the particles can be regulated, for example, by granulation, sieving, classification and the like. The method may be any suitable method. Regarding the granulation, examples of methods usable herein include spray granulation, tumbling granulation, compression granulation, agitation granulation, briquetting, compacting, extrusion granulation, fluidized bed granulation, emulsion granulation, and submerged granulation. Among the above methods, spray granulation, tumbling granulation, and compression granulation are particularly preferred.

When the properties of the particle are regulated, a mixture containing the phyllosilicate belonging to the smectite group and the phyllosilicate belonging to the mica group may be previously brought to a form suitable for the regulation method. For example, when spray granulation is adopted for regulating the properties of the particle, preferably, the above mixture is previously dispersed in a dispersing medium to prepare a slurry.

The dispersing medium used in the spray granulation is preferably water or an organic material (for example, methanol, ethanol, chloroform, methylene chloride, pentane, hexane, heptane, toluene, and xylene). These dispersing media may be used alone or as a mixture of two or more. Among them, water is particularly preferred. The concentration of the slurry is 5 to 70% by weight, preferably 10 to 50% by weight, more preferably 20 to 40% by weight. The optimal concentration of the slurry may be properly selected by taking the viscosity of the slurry into consideration. Specifically, the concentration of the slurry is not more than 6000 cps, preferably 10 to 5000 cps, particularly 1000 to 3000 cps.

In the present invention, the viscosity of the slurry is a value as measured with a Brookfield viscometer at 30° C. and 6 rpm. When the viscosity exceeds 6000 cps, the feed of the liquid into the spray nozzle is difficult and, in addition, clogging of the nozzle and other unfavorable phenomena are likely to occur. When the concentration of the slurry is lowered in order to lower the viscosity, there is tendency that only small particles can be produced. Although the diameter of the particles prepared by granulation varies depending upon the spray speed, a slurry concentration of less than 5% makes it difficult to prepare particles having a diameter of not less than 10 $\mu$m. In the spray granulation, a conventional spray drying method may be applied such as a disc type or pressure nozzle or two-fluid nozzle type drying method. In any case, the input temperature of the hot air at the time of spraying may be set in a wide temperature range of from about 150 to 300° C. Although the exhaust temperature is specified by the spray flow rate through the nozzle and the like, it is preferably about 100° C.

Therefore, one representative, simple, and economical process for producing the particulate phyllosilicate mixture of the present invention comprises subjecting a mixed powder composed of the phyllosilicate belonging to the mica group and the phyllosilicate belonging to the smectite group to ion exchange treatment, dispersing the resultant ion exchanged product in a dispersing medium to prepare a slurry, and spray-granulating the slurry. In this case, the content of the phyllosilicate belonging to the smectite group is preferably 10 to 50% by weight, particularly preferably 30 to 50% by weight.

Another representative, simple, economical process comprises dispersing the phyllosilicate belonging to the mica group, which has been subjected to ion exchange treatment, in a dispersing medium to prepare a slurry, adding a slurry of the phyllosilicate belonging to the smectite group, which has not been subjected to ion exchange treatment, mixing the slurries together, and spray-granulating the mixed slurry. In this case, the amount of the phyllosilicate belonging to the smectite group added is 0.1 to 30% by weight, particularly preferably 0.1 to 15% by weight. This can provide a granulated product having high strength and high bulk density.

Typical particulate phyllosilicate mixtures suitable for use as a carrier as Component (B) for the catalysts for polymerizing olefines in the present invention include:

those where the particulate phyllosilicate of the mica group is ion-exchangeable;

those where the particulate phyllosilicate of the mica group has not less than 30% of the exchangeable cations exchanged with a cation of an element of Groups 2 to 14 of Periodic Table or $H^+$; and those where the particulate phyllosilicate mixtures have not less than 30% all the exchangeable cations contained therein exchanged with a cation of an element of Group 2 to 14 of Periodic Table.

2. Catalyst for polymerization of olefin

The particulate phyllosilicate mixture of the present invention is suitably usable particularly as a carrier for a catalytic component for the polymerization of an olefin. Especially preferably, the particulate phyllosilicate mixture may be effectively used in a catalyst, for the polymerization of an olefin, comprising a metallocene transition metal compound, an organoaluminum compound, and optional other compound(s).

The catalyst for polymerizing olefins in accordance with the present invention comprises Component (A) which is a metallocene compound of a transition metal and Component (B) which is a particulate phyllosilicate mixture comprising a phyllosilicate of the smectite group and a phyllosilicate of the mica group, the former comprising 1 to 50% by weight of the phyllosilicate mixture.

<Metallocene compound of transition metal/Component (A)>

The metallocene compounds of transition metals in the catalyst of the present invention may be those used in conventional metallocene catalysts for the polymerization of an olefin. For example, it may be an organometal compound comprising an optionally substituted one or two cyclopentadienyl ligands, that is, one or two cyclopentadienyl ring-containing ligand, with substituent being optionally combined to form a condensed ring, and a group 3, 4, 5, or 6 transition metal of the long form of the Periodic Table, or a cationic complex thereof. The Periodic Table herein means the one based on the 18 Groups recommended by IUPAC in 1989.

Preferred metallocene compounds include compounds represented by the following general formulae [1] and [2]:

$$(CpR_aH_{5-a})_p(CpR^2_bH_{5-b})_qMR^3 \quad [1]$$

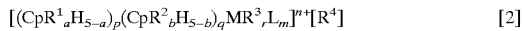

$$[(CpR^1_aH_{5-a})_p(CpR^2_bH_{5-b})_qMR^3{}_rL_m]^{n+}[R^4] \quad [2]$$

In the formulae [1] and [2], Cp represents a conjugated, five-membered ring ligand and $R^1$ and $R^2$ represent a substituent on Cp. Therefore, $CpR^1_aH_{5-a}$ and $CpR^2_bH_{5-b}$ represent derivatives of a cyclopentadienyl (Cp) group.

$R^1$ and $R^2$ each independently represent an optionally substituted hydrocarbon group (when substituted, the substituent being preferably, for example, an alkyl group of 1 to 30 carbon atoms, an aryl group of 6 to 30 carbon atoms, or a halogen atom), a silicon-containing group, a phosphorus-containing group, a nitrogen-containing group, and an oxygen-containing group, having 1 to 30 carbon atoms. When a plurality of $R^1$s and $R^2$s are present, all of $R^1$s and $R^2$s do not need respectively to represent the same group and $R^1$ and $R^2$ may be the same or different.

The examples of $R^1$ and of $R^2$ include (i) hydrocarbon groups such as (a) alkyl groups of 1 to 30, preferably 1 to 10 carbon atoms such as methyl, ethyl, propyl, isopropyl, butyl, isobutyl, t-butyl, pentyl, isopentyl, hexyl, heptyl, octyl, nonyl, and decyl groups, (b) aryl groups of 6 to 30, preferably 6 to 20 carbon atoms such as phenyl, p-tolyl, o-tolyl, and m-tolyl groups, (ii) halo-derivatives of the hydrocarbon group of (i) such as fluoromethyl, fluoroethyl, fluorophenyl, chloromethyl, chloroethyl, chlorophenyl, bromomethyl, bromoethyl, bromophenyl, iodomethyl, iodoethyl, and iodophenyl groups, (iii) silicon-containing hydrocarbon groups of 1 to 30, preferably 1 to 10 carbon atoms such as trimethylsilyl, triethylsilyl, and triphenylsilyl groups, (iv) phosphorus-containing hydrocarbon groups of 1 to 30, preferably 1 to 12 carbon atoms such as dimethylphosphino, diethylphosphino, and diphenylphosphino groups, (v) nitrogen-containing hydrocarbon groups of 1 to 30, preferably 1 to 10 carbon atoms such as dimethylamino, diethylamino, and diisopropylamino groups, (vi) oxygen-containing hydrocarbon groups of 1 to 30, preferably 1 to 20 carbon atoms such as (a) alkoxy groups such as methoxy, ethoxy, and t-butoxy groups, and (b) aryloxy groups such as phenoxy, methylphenoxy, pentamethylphenoxy, p-tolyloxy, m-tolyloxy, and o-tolyloxy groups.

Among these, more preferable $R^1$ and $R^2$, respectively, include alkyl groups of 1 to 4 carbon atoms, such as methyl, ethyl, propyl, isopropyl, butyl, isobutyl, and t-butyl groups, alkyl-substituted silicon-containing groups of preferably 1 to 4 carbon atoms in the alkyl such as trimethylsilyl; alkoxy groups of 1 to 4 carbon atoms such as methoxyl group; and aryloxy groups such as phenoxy group.

The two cyclopentadienyl group may or may not be combined through a bridge. The bridge can be construed as consisting of the $R^1$ and $R^2$ combined with each other at their ω-terminus when respectively at least one $R^1$ and $R^2$ are present on the cyclopentadienyl groups.

Specific examples of the bridge include (i) alkylene groups of 1 to 30, preferably 1 to 20 carbon atoms, for example, methylene and ethylene groups, (ii) alkylidene groups of 1 to 20 carbon atoms, for example, ethylidene and propylidene groups, (iii) silicon-containing bridge groups of 1 to 20 carbon atoms, particularly substituted or unsubstituted silylene or oligosilylene groups (with the substituent being preferably a lower alkyl group (having 4 or less carbon atoms)), for example, dimethylsilylene, diethylsilylene, diisopropylsilylene, diphenylsilylene, methylethylsilylene, methylphenylsilylene, methylisopropylsilylene and methyl-t-butylsilylene groups, (iv) germanium-containing bridge groups of 1 to 20 carbon atoms, particularly substituted or unsubstituted germylene or oligogermylene groups (wherein the substituent is preferably a lower alkyl group having about four or less carbon atoms), for example, dimethylgermylene, diethylgermylene, dipropylgermylene, diisopropylgermylene, methylethylgermylene, methylphenylgermylene, methylisopropylgermylene and methyl-t-butylgermylene groups, (v) N-containing groups such as amino groups wherein, in the case of secondary or tertiary amino groups, the substituent is preferably a lower alkyl group having four or less carbon atoms, (vi) P-containing groups, such as a phosphinyl group, and (vii) a direct linkage.

When two or more of $R^1$s (or $R^2$s) are present on an identical Cp, the $R^1$s at their ω-ends (or $R^2$s at their ω-ends) can combine with each other to form a ring.

A specific example thereof is a structure wherein two $R^1$s, in their ω-ends, bonded respectively to two adjacent carbon atoms in Cp combine with each other to own the two carbon atoms in Cp jointly, thereby forming a condensed ring, typically an indenyl or fluorenyl group. The condensed ring derived from $R^1$ may be an unsubstituted one (in the case of the above compound, examples of the unsubstituted condensed ring including tetrahydroindenyl and octahydrofluorenyl groups) or a substituted one (examples of preferred substituents including methyl, ethyl, butyl, and phenyl groups). The condensed ring derived from $R^1$ is an unsubstituted one means that the total number of carbon atoms of the two $R^1$s is equal to the number of carbon atoms necessary for the condensed ring. When the total number of carbon atoms of the two $R^1$s is larger than the number of carbon atoms necessary for the condensed ring, the excess number of carbon atoms serve as a substituent. As with $R^1$, $R^2$ bonded to another Cp in an identical compound can form a condensed ring.

$R^3$ represents an optionally substituted hydrocarbon group having 1 to 20 carbon atoms (examples of preferred substituents including methyl, ethyl, and benzyl groups), hydrogen, a halogen, a silicon-containing substituent, an alkoxy group, an aryloxy group, an amido group, a thioalkoxy group, $S(O)_s$, $R^5$, $OR^5$, $NR^5_t$, $SiR^5$, or $P(O)_uR^5_3$ wherein s is 0, 1, 2, or 3, t is 0, 1, 2, or 3, u is 0, 1, 2, or 3 and $R^5$ which may be the same or different represent hydrogen, a halogen, a silicon-containing group, or an optionally halogen-substituted hydrocarbon group having 1 to 20 carbon atoms.

Specific examples of preferred $R^3$ include (i) alkyl groups, particularly methyl, ethyl, propyl, isopropyl, butyl, isobutyl, t-butyl, pentyl, isopentyl, hexyl, heptyl, octyl, nonyl, and decyl groups, (ii) aryl groups, particularly phenyl groups, p-tolyl, o-tolyl, and m-tolyl groups, (iii) halo-substituted hydrocarbon groups, particularly fluoromethyl, fluoroethyl, fluorophenyl, fluorophenyl, chloromethyl, chloroethyl, chlorophenyl, bromomethyl, bromoethyl, bromophenyl, iodomethyl, iodoethyl, and iodophenyl groups, (iv) halogens, particularly fluorine, chlorine, bromine, and iodine, (v) silicon-containing group, particularly trimethylsilyl, triethylsilyl, and triphenylsilyl groups, (vi) alkoxy, preferably lower alkyloxy groups, particularly methoxy, ethoxy, propoxy, isopropoxy, butoxy, isobutoxy, and t-butoxy groups, (vii) aryloxy groups, particularly phenoxy, methylphenoxy, pentamethylphenoxy, p-tolyloxy, m-tolyloxy, and o-tolyloxy groups, (viii) amide groups, preferably di-lower-alkyl amido groups, particularly dimethylamido, diethylamido, dipropylamido, diisopropylamido, ethyl-t-butylamido, and bis (trimethylsilyl)amido, (ix) thioalkoxy group, preferably lower alkylthio lower alkyloxy groups, particularly a methylthioalkoxy, ethylthioalkoxy, propylthioalkoxy, butylthioalkoxy, t-butylthioalkoxy, and phenylthioalkoxy groups, and (x) hydrogen. Among them, more preferable are hydrogen, methyl, ethyl, propyl, isopropyl, butyl, phenyl groups, halogens, particularly chloride, methoxy, ethoxy, propoxy, isopropoxy, dimethylamido, and methylthioalkoxy groups; hydrogen, methyl and chlorine being most preferable.

In addition to the above typical examples of $R^1$ to $R^3$, $R^3$ can combine with $R^1$, $R^2$, or Cp. Specific examples of preferred ligands include $CpH_4(CH_2)_nO$— ($1 \leq n \leq 5$), $CpMe_4(CH_2)_nO$— ($1 \leq n \leq 5$), $CpH_4(Me_2Si)(t-Bu)N$—, and $CpMe_4(Me_2Si)(t-Bu)N$— wherein Cp represents a cyclopentadienyl group, Me represents a methyl group and Bu represents a butyl group). Further, $R^3$s when present in plural can combine with each other to form a bidentate ligand. Specific examples of such $R^3$ include —OCH$_2$O—, —OCH$_2$CH$_2$O— and —O(o-C$_6$H$_4$)O—. $R^1$ to $R^3$ in the nontypical examples of $R^1$ to $R^3$ are as defined in the case of typical examples so far as there is no contradiction.

M represents a Group 3, 4, 5, or 6 element of the Periodic Table, and specific examples thereof include scandium, yttrium, lanthanum, cerium, praseodymium, neodymium, samarium, europium, gadolinium, terbium, dysprosium, holmium, erbium, thulium, ytterbium, rutetium, actinium, thorium, protactinium, uranium, titanium, zirconium, hafnium, vanadium, niobium, tantalum, chromium, molybdenum, and tungsten. Among them, titanium, zirconium, and hafnium belonging to the Group 4 of the Periodic Table are preferred. Further, they can be used as a mixture of two or more.

L represents an electrically neutral ligand, and m represents an integer of 0 (zero) or more. Specific examples thereof include (i) ethers, especially monoethers, particularly ethers with the hydrocarbon, bonded to ether oxygen, having about 1 to 5 carbon atoms, for example, diethyl ether, tetrahydrofuran, and dioxane, (ii) nitrites, especially those with the hydrocarbon, bonded to a cyano group, having about 1 to 6 carbon atoms, for example, acetonitrile, (iii) amides, especially N,N-di-lower-alkyl lower fatty acid amides, for example, dimethylformamide, (iv) phosphines, especially tri-lower-alkylphosphines and triphenylphosphine, for example, trimethylphosphine, and (v) amines, especially lower-alkylamines, for example, trimethylamine. Particularly preferred are tetrahydrofuran, trimethylphosphine, and trimethylamine.

[$R^4$] represents an anion for neutralizing a cation, and the number of $R^4$s is 1 or not less than 2. Specific examples of [$R^4$] include tetraphenyl borate, tetra(p-tolyl) borate, carbadodecaborate, dicarbaundecaborate, tetrakis (pentafluorophenyl) borate, tetrafluoroborate, hexafluorophosphate. That is, preferred examples of $R^4$ include borates containing a hydrocarbon or halohydrocarbon having about 1 to 30 carbon atoms, or a halogen, and phosphates containing the above groups. Tetraphenyl borate, tetra (p-tolyl) borate, tetrafluoroborate and hexafluorophosphate being preferable.

a and b each independently are an integer of 0 to 5. When the metallocene compound is represented by the formula [1], p, q, and r are zero or a positive, satisfying p+q+r=V wherein V represents the valency of M, and, when the metallocene compound is represented by the formula [2], p, q, and r are zero or a positive, satisfying p+q+r=V−n wherein V is as defined above. In general, p and q are an integer of 0 to 3, preferably 0 or 1. r is an integer of 0 to 3, preferably 1 or 2. n is an integer satisfying $0 \leq n \leq V$.

Specific examples of preferred zirconium compounds in metallocene transition metal compounds represented by the formula [1], among the above metallocene transition metal compounds, include:

(1) bis(methylcyclopentadienyl)zirconium dichloride,
(2) bis(ethylcyclopentadienyl)zirconium dichloride,
(3) bis(methylcyclopentadienyl)zirconium dimethyl,
(4) bis(ethylcyclopentadienyl)zirconium dimethyl,
(5) bis(methylcyclopentadienyl)zirconium dihydride,
(6) bis(ethylcyclopentadienyl)zirconium dihydride,
(7) bis(dimethylcyclopentadienyl)zirconium dichloride,
(8) bis(trimethylcyclopentadienyl)zirconium dichloride,
(9) bis(tetramethylcyclopentadienyl)zirconium dichloride,
(10) bis(ethyltetramethylcyclopentadienyl)zirconium dichloride,
(11) bis(indenyl)zirconium dichloride,
(12) bis(dimethylcyclopentadienyl)zirconium dimethyl,
(13) bis(trimethylcyclopentadienyl)zirconium dimethyl,
(14) bis(tetramethylcyclopentadienyl)zirconium dimethyl,
(15) bis(ethyltetramethylcyclopentadienyl)zirconium dimethyl,
(16) bis(indenyl)zirconium dimethyl,
(17) bis(dimethylcyclopentadienyl)zirconium dihydride,
(18) bis(trimethylcyclopentadienyl)zirconium dihydride,
(19) bis(ethyltetramethyicyclopentadienyl)zirconium dihydride,
(20) bis(trimethylsilylcyclopentadienyl)zirconium dimethyl,
(21) bis(trimethylsilylcyclopentadienyl)zirconium dihydride,
(22) bis(trifluoromethylcyclopentadienyl)zirconium dichloride,
(23) bis(trifluoromethylcyclopentadienyl)zirconium dimethyl,
(24) bis(trifluoromethylcyclopentadienyl)zirconium dihydride,

(25) isopropylidene-bis(indenyl)zirconium dichloride,
(26) isopropylidene-bis(indenyl)zirconium dihydride,
(27) isopropylidene-bis(indenyl)zirconium dihydride,
(28) pentamethylcyclopentadienyl(cyclopentadienyl) zirconium dichloride,
(29) pentamethylcyclopentadienyl(cyclopentadienyl) zirconium dimethyl,
(30) pentamethylcyclopentadienyl(cyclopentadienyl) zirconium dihydride,
(31) ethyltetramethylcyclopentadienyl(cyclopentadienyl) zirconium dihydride,
(32) isopropylidene(cyclopentadienyl)(fluorenyl) zirconium dichloride,
(33) isopropylidene(cyclopentadienyl)(fluorenyl) zirconium dimethyl,
(34) dimethylsilyl(cyclopentadienyl)(fluorenyl)- zirconium dimethyl,
(35) isopropylidene(cyclopentadienyl)(fluorenyl) zirconium dihydride,
(36) bis(cyclopentadienyl)zirconium dichloride,
(37) bis(cyclopentadienyl)zirconium dimethyl,
(38) bis(cyclopentadienyl)zirconium diethyl,
(39) bis(cyclopentadienyl)zirconium dipropyl,
(40) bis(cyclopentadienyl)zirconium diphenyl,
(41) methylcyclopentadienyl(cyclopentadienyl)- zirconium dichloride,
(42) ethylcyclopentadienyl(cyclopentadienyl)zirconium dichloride,
(43) methylcyclopentadienyl(cyclopentadienyl)- zirconium dimethyl,
(44) ethylcyclopentadienyl(cyclopentadienyl)zirconium dimethyl,
(45) methylcyclopentadienyl(cyclopentadienyl)- zirconium dihydride,
(46) ethylcyclopentadienyl(cyclopentadiethyl)zirconium dihydride,
(47) dimethylcyclopentadienyl(cyclopentadienyl) zirconium dichloride,
(48) trimethylcyclopentadienyl(cyclopentadienyl) zirconium dichloride,
(49) tetramethylcyclopentadienyl(cyclopentadienyl) zirconium dichloride,
(50) bis(pentamethylcyclopentadienyl)zirconium dichloride,
(51) tetramethylcyclopentadienyl(cyclopentadienyl) zirconium dichoride,
(52) indenyl(cyclopentadienyl)zirconium dichloride,
(53) dimethylcyclopentadienyl(cyclopentadienyl) zirconium dimethyl,
(54) trimethylcyclopentadienyl(cyclopentadienyl) zirconium dimethyl,
(55) tetramethylcyclopentadienyl(cyclopentadienyl) zirconium dimethyl,
(56) bis(pentamethylcyclopentadienyl)zirconium dimethyl,
(57) ethyltetramethylcyclopentadienyl(cyclopentadienyl) zirconium dimethyl,
(58) indenyl(cyclopentadienyl)zirconium dimethyl,
(59) dimethylcyclopentadienyl(cyclopentadienyl) zirconium dihydride,
(60) trimethylcyclopentadienyl(cyclopentadienyl) zirconium dihydride,
(61) bis(pentamethylcyclopentadienyl)zirconium dihydride,
(62) indenyl(cyclopentadienyl)zirconium dihydride,
(63) trimethylsilylcyclopentadienyl(cyclopentadienyl) zirconium dimethyl,
(64) trimethylsilylcyclopentadienyl(cyclopentadienyl) zirconium dihydride,
(65) trifluoromethylcyclopentadienyl-(cyclopentadienyl) zirconium dichloride,
(66) trifluoromethylcyclopentadienyl-(cyclopentadienyl) zirconium dimethyl,
(67) trifluoromethylcyclopentadienyl-(cyclopentadienyl) zirconium dihydride,
(68) bis(cyclopentadienyl)(trimethylsilyl)(methyl) zirconium,
(69) bis(cyclopentadienyl) (triphenylsilyl)(methyl) zirconium,
(70) bis(cyclopentadienyl)[tris(trimethylsilyl)silyl](methyl)zirconium,
(71) bis(cyclopentadienyl)[bis(methylsilyl)silyl](methyl) zirconium,
(72) bis(cyclopentadienyl)(trimethylsilyl) (trimethylsilylmethyl)zirconium,
(73) bis(cyclopentadienyl)(trimethylsilyl)(benzyl) zirconium,
(74) methylene-bis(cyclopentadienyl)zirconium dichloride,
(75) ethylene-bis(cyclopentadienyl)zirconium dichloride,
(76) isopropylidene-bis(cyclopentadienyl)zirconium dichloride,
(77) dimethylsilyl-bis(cyclopentadienyl)zirconium dichloride,
(78) methylene-bis(cyclopentadienyl)zirconium dimethyl,
(79) ethylene-bis(cyclopentadienyl)zirconium dimethyl,
(80) isopropylidene-bis(cyclopentadienyl)zirconium dimethyl,
(81) dimethylsilyl-bis(cyclopentadienyl)zirconium dimethyl,
(82) methylene-bis(cyclopentadienyl)zirconium dihydride,
(83) ethylene-bis(cyclopentadienyl)zirconium dihydride,
(84) isopropylidene-bis(cyclopentadienyl)zirconium dihydride,
(85) dimethylsilyl-bis(cyclopentadienyl)zirconium dihydride,
(86) bis(cyclopentadienyl)zirconium bis (methanesulfonato),
(87) bis(cyclopentadienyl)zirconium bis(p-toluenesulfonato),
(88) bis(cyclopentadienyl)zirconium bis (trifluoromethanesulfonato)
(89) bis(cyclopentadienyl)zirconium trifluoromethane-sulfonato chloride,
(90) bis(cyclopentadienyl)zirconium bis (benzenesulfonato),
(91) bis(cyclopentadienyl)zirconium bis (pentafluorobenzenesulfonato),
(92) bis(cyclopentadienyl)zirconium benzenesulfonato chloride,
(93) bis(cyclopentadienyl)zirconium(ethoxy) trifluoromethanesulfonato,

(94) bis(tetramethylcyclopentadienyl)zirconium bis (trifluoromethanesulfonato),
(95) bis(indenyl)zirconium bis (trifluoromethanesulfonato),
(96) ethylene-bis(indenyl)zirconium bis (trifluoromethanesulfonato),
(97) isopropylidene-bis(indenyl)zirconium bis (trifluoromethanesulfonato),
(98) (tert-butylamido)dimethyl (tetramethylcyclopentadienyl)silanedibenzylzirconium (tert-butylamido)dimethyl(2,3,4,5-tetramethylcyclopentadienyl)silanedibenzylzirconium,
(99) indenylzirconium tris(dimethylamido),
(100) indenylzirconium tris(diethylamido),
(101) indenylzirconium tris(di-n-propylamido),
(102) cyclopentadienylzirconium tris(dimethylamido),
(103) methylcyclopentadienylzirconium tris (dimethylamido),
(104) (tert-butylamido)(tetramethylcyclopentadienyl)-1,2-ethanediylzirconium dichloride,
(105) (methylamido)-(tetramethylcyclopentadienyl)-1,2-ethanediylzirconium dichloride,
(106) (ethylamido)(tetramethylcyclopentadienyl) methylenezirconium chloride,
(107) (tert-butylamido)dimethyl (tetramethylcyclopentadienyl)silanezirconium dichloride,
(108) (benzylamido)dimethyl (tetramethylcyclopentadienyl)silanezirconium dichloride,
(109) (phenylphosphido)dimethyl (tetramethylcyclopentadienyl)silanezirconium dichloride and dibenzyl,
(110) (benzylamido)dimethyl (tetramethylcyclopentadienyl)silanezirconium dichloride,
(111) (2-methoxyphenylamido)dimethyl (tetramethylcyclopentadienyl)silanezirconium dichloride,
(112) (4-fluorophenylamido)dimethyl (tetramethylcyclopentadienyl)silanezirconium dichloride,
(113) ((2,6-di(1-methylethyl)phenyl)amido)dimethyl (tetramethylcyclopentadienyl)amidozirconium dichloride,
(114) bis(1,3-dimethylcyclopentadienyl)zirconium dichloride,
(115) bis(1-ethyl-3-methylcyclopentadienyl)zirconium dichloride,
(116) bis(1-n-propyl-3-methylcyclopentadienyl)-zirconium dichloride,
(117) bis(1-i-propyl-3-methylcyclopentadienyl) zirconium dichloride,
(118) (bis-1-n-butyl-3-methylcyclopentadienyl)-zirconium dichloride,
(119) bis(1-i-butyl-3-methylcyclopentadienyl)zirconium dichloride,
(120) bis(1-cyclohexyl-3-methylcyclopentadienyl) zirconium dichloride,
(121) bis(1,3-dimethylcyclopentadienyl)zirconium dimethyl,
(122) bis(1-ethyl-3-methylcyclopentadienyl)zirconium dimethyl,
(123) bis(1-n-propyl-3-methylcyclopentadienyl)-zirconium dimethyl,
(124) bis(1-n-butyl-3-methylcyclopentadienyl)zirconium dimethyl,
(125) bis(1,3-dimethylcyclopentadienyl)zirconium bis (diethylamido),
(126) bis(1-ethyl-3-methylcyclopentadienyl)zirconium bis(diethylamido), and
(127) bis(1-n-butyl-3-methylcyclopentadienyl)zirconium bis(diethylamido).

Specific examples of preferred zirconium compounds in metallocene compounds represented by the formula [2] include:

(1) bis(methylcyclopentadienyl)zirconium (chloride) (tetraphenyl borate)tetrahydrofuran complex,
(2) bis(ethylcyclopentadienyl)zirconium (chloride) (tetraphenyl borate)tetrahydrofuran complex,
(3) bis(methylcyclopentadienyl)zirconium (methyl) (tetraphenyl borate)tetrahydrofuran complex,
(4) bis(ethylcyclopentadienyl)zirconium (methyl) (tetraphenyl borate)tetrahydrofuran complex,
(5) bis(methylcyclopentadienyl)zirconium (hydride) (tetraphenyl borate)tetrahydrofuran complex,
(6) bis(ethylcyclopentadienyl)zirconium (hydride) (tetraphenyl borate)tetrahydrofuran complex,
(7) bis(dimethylcyclopentadienyl)zirconium (chloride) (tetraphenyl borate)tetrahydrofuran complex,
(8) bis(trimethylcyclopentadienyl)zirconium (chloride) (tetraphenylborate)tetrahydrofuran complex,
(9) bis(tetramethylcyclopentadienyl)zirconium (chloride) (tetraphenylborate)tetrahydrofuran complex,
(10) bis(ethyltetramethylcyclopentadienyl)zirconium (chloride) (tetraphenylborate)tetrahydrofuran complex,
(11) bis(indenyl)zirconium (chloride) (tetraphenyl borate) tetrahydrofuran complex,
(12) bis(dimethylcyclopentadienyl)zirconium (methyl) (tetraphenyl borate)tetrahydrofuran complex,
(13) bis(trimethylcyclopentadienyl)zirconium (methyl) (tetraphenylborate)tetrahydrofuran complex,
(14) bis(tetramethylcyclopentadienyl)zirconium (methyl) (tetraphenylborate)tetrahydrofuran complex,
(15) bis(ethyltetramethylcyclopentadienyl)zirconium (methyl) (tetraphenylborate)tetrahydrofuran complex,
(16) bis(indenyl)zirconium (methyl) (tetraphenylborate) tetrahydrofuran complex,
(17) bis(dimethylcyclopentadienyl)zirconium (hydride) (tetraphenylborate)tetrahydrofuran complex,
(18) bis(trimethylcyclopentadienyl)zirconium (hydride) (tetraphenyl borate)tetrahydrofuran complex,
(19) bis(ethyltetramethylcyclopentadienyl)zirconium (hydride) (tetraphenylborate)tetrahydrofuran complex,
(20) bis(trimethylsilylcyclopentadienyl)zirconium (methyl) (tetraphenylborate)tetrahydrofuran complex,
(21) bis(trimethylsilylcyclopentadienyl)zirconium (hydride) (tetraphenylborate)tetrahydrofuran complex,
(22) bis(trifluoromethylcyclopentadienyl)zirconium (methyl) (tetraphenylborate)tetrahydrofuran complex,
(23) bis(trifluoromethylcyclopentadienyl)zirconium (hydride) (tetraphenylborate)tetrahydrofuran complex,
(24) isopropylidene-bis(indenyl)zirconium (chloride) (tetraphenyl borate)tetrahydrofuran complex,
(25) isopropylidene-bis(indenyl)zirconium (methyl) (tetraphenyl borate)tetrahydrofuran complex,

(26) isopropylidene-bis(indenyl)zirconium (hydride) (tetraphenyl borate)tetrahydrofuran complex,
(27) pentamethylcyclopentadienyl(cyclopentadienyl) zirconium (chloride) (tetraphenyl borate) tetrahydrofuran complex,
(28) ethyltetramethylcyclopentadienyl(cyclopentadienyl) zirconium (chloride) (tetraphenylborate) tetrahydrofuran complex,
(29) pentamethylcyclopentadienyl (cyclopentadienyl) zirconium (methyl) (tetraphenylborate)tetrahydrofuran complex,
(30) ethyltetramethylcyclopentadienyl(cyclopentadienyl) zirconium (methyl) (tetraphenylborate)tetrahydrofuran complex,
(31) pentamethylcyclopentadienyl)zirconium (hydride) (tetraphenylborate)tetrahydrofuran complex,
(32) ethyltetramethylcyclopentadienyl)zirconium (hydride) (tetraphenylborate)tetrahydrofuran complex,
(33) isopropylidene(cyclopentadienyl)(fluorenyl) zirconium (chloride) (tetraphenyl borate) tetrahydrofuran complex,
(34) isopropylidene (cyclopentadienyl)(fluorenyl) zirconium (methyl) (tetraphenylborate)tetrahydrofuran complex,
(35) isopropylidene (cyclopentadienyl)(fluorenyl) zirconium (hydride) (tetraphenylborate) tetrahydrofuran complex,
(36) bis(cyclopentadienyl)zirconium (chloride) (tetraphenylborate)tetrahydrofuran complex,
(37) bis(cyclopentadienyl)(methyl)zirconium (tetraphenyl borate)tetrahydrofuran complex,
(38) bis(cyclopentadienyl)(ethyl)zirconium (tetraphenylborate)tetrahydrofuran complex,
(39) bis(cyclopentadienyl)(propyl)zirconium (tetraphenylborate)tetrahydrofuran complex,
(40) bis(cyclopentadienyl)(phenyl)zirconium (tetraphenylborate)tetrahydrofuran complex,
(41) methylcyclopentadienyl(cyclopentadienyl) zirconium (chloride) (tetraphenyl borate) tetrahydrofuran complex,
(42) ethylcyclopentadienyl(cyclopentadienyl)zirconium (chloride) (tetraphenylborate)tetrahydrofuran complex,
(43) bis(ethylcyclopentadienyl)zirconium (chloride) (tetraphenylborate)tetrahydrofuran complex,
(44) methylcyclopentadienyl (cyclopentadienyl) zirconium (methyl) (tetraphenylborate)- tetrahydrofuran complex,
(45) ethylcyclopentadienyl (cyclopentadienyl)zirconium (methyl) (tetraphenylborate)-tetrahydrofuran complex,
(46) methylcyclopentadienyl (cyclopentadienyl) zirconium (hydride) (tetraphenylborate)- tetrahydrofuran complex,
(47) ethylcyclopentadienyl (cyclopentadienyl)zirconium (hydride) (tetraphenylborate)-tetrahydrofuran complex,
(48) dimethylcyclopentadienyl(cyclopentadienyl) zirconium (chloride) (tetraphenyl borate) tetrahydrofuran complex,
(49) trimethylcyclopentadienyl (cyclopentadienyl) zirconium (chloride) (tetraphenylborate)- tetrahydrofuran complex,
(50) tetramethylcyclopentadienyl (cyclopentadienyl) zirconium (chloride) (tetraphenylborate)- tetrahydrofuran complex,
(51) bis(pentamethylcyclopentadienyl)zirconium (chloride) (tetraphenylborate)tetrahydrofuran complex,
(52) indenyl(cyclopentadienyl)zirconium (chloride) (tetraphenyl borate)tetrahydrofuran complex,
(53) dimethylcyclopentadienyl (cyclopentadienyl) zirconium (methyl) (tetraphenylborate)- tetrahydrofuran complex,
(54) trimethylcyclopentadienyl(cyclopentadienyl) zirconium (methyl) (tetraphenyl borate)tetrahydrofuran complex,
(55) tetramethylcyclopentadienyl (cyclopentadienyl) zirconium (methyl) (tetraphenylborate)- tetrahydrofuran complex,
(56) bis(pentamethylcyclopentadienyl)zirconium (methyl) (tetraphenylborate)tetrahydrofuran complex,
(57) cyclopentadienyl (indenyl)zirconium (methyl) (tetraphenylborate)tetrahydrofuran complex,
(58) dimethylcyclopentadienyl (cyclopentadienyl) zirconium (hydride) (tetraphenylborate) tetrahydrofuran complex,
(59) trimethylcyclopentadienyl (cyclopentadienyl) zirconium (hydride) (tetraphenylborate)- tetrahydrofuran complex,
(60) bis(pentamethylcyclopentadienyl)zirconium (hydride) (tetraphenylborate)-tetrahydrofuran complex,
(61) indenyl(cyclopentadienyl)zirconium (hydride) (tetraphenylborate) tetrahydrofuran complex,
(62) trimethylsilylcyclopentadienyl(cyclopentadienyl) zirconium (methyl) (tetraphenylborate) tetrahydrofuran complex,
(63) trimethylsilylcyclopentadienyl(cyclopentadienyl) zirconium (hydride) (tetraphenylborate) tetrahydrofuran complex,
(64) trifluoromethylcyclopentadienyl(cyclopentadienyl) zirconium (hydride) (tetraphenylborate) tetrahydrofuran complex,
(65) bis(cyclopentadienyl)(trimethylsilyl)zirconium (tetraphenyl borate)tetrahydrofuran complex,
(66) bis(cyclopentadienyl) (triphenylsilyl)zirconium (tetraphenylborate)tetrahydrofuran complex,
(67) bis(cyclopentadienyl)[tris(trimethylsilyl)silyl]- zirconium (tetraphenylborate)tetrahydrofuran complex,
(68) bis(cyclopentadienyl)(trimethylsilylmethyl) zirconium (tetraphenyl borate)tetrahydrofuran complex,
(69) bis(cyclopentadienyl) (benzyl)zirconium (tetraphenylborate)tetrahydrofuran complex,
(70) methylene-bis(cyclopentadienyl)zirconium (chloride) (tetraphenylborate)tetrahydrofuran complex,
(71) ethylene-bis(cyclopentadienyl)zirconium (chloride) (tetraphenyl borate)tetrahydrofuran complex,
(72) isopropylidene-bis(cyclopentadienyl)zirconium (chloride) (tetraphenylborate)tetrahydrofuran complex,
(73) dimethylsilyl-bis(cyclopentadienyl)zirconium (chloride) (tetraphenyl borate)tetrahydrofuran complex,
(74) methylene-bis(cyclopentadienyl)zirconium (methyl) (tetraphenylborate)tetrahydrofuran complex,
(75) ethylene-bis(cyclopentadienyl)zirconium (methyl) (tetraphenyl borate)tetrahydrofuran complex,
(76) isopropylidene-bis(cyclopentadienyl)zirconium (methyl) (tetraphenylborate)tetrahydrofuran complex,

(77) dimethylsilyl-bis(cyclopentadienyl)zirconium (methyl) (tetraphenyl borate)tetrahydrofuran complex,

(78) methylene-bis(cyclopentadienyl)zirconium (hydride) (tetraphenylborate)tetrahydrofuran complex,

(79) ethylene-bis(cyclopentadienyl)zirconium (hydride) (tetraphenyl borate)tetrahydrofuran complex,

(80) isopropylidene-bis(cyclopentadienyl)zirconium (hydride) (tetraphenylborate)tetrahydrofuran complex,

(81) dimethylsilyl-bis(cyclopentadienyl)zirconium (hydride) (tetraphenylborate)tetrahydrofuran complex,

(82) bis(cyclopentadienyl)zirconium (methanesulfonato) (tetraphenyl borate)tetrahydrofuran complex,

(83) bis(cyclopentadienyl)zirconium (p-toluenesulfonato) (tetraphenylborate)tetrahydrofuran complex,

(84) bis(cyclopentadienyl)zirconium (trifluoromethanesulfonato) (tetraphenylborate) tetrahydrofuran complex,

(85) bis(cyclopentadienyl)zirconium (benzenesulfonato) (tetraphenylborate)tetrahydrofuran complex,

(86) bis(cyclopentadienyl)zirconium (pentafluorobenzenesulfonato) (tetraphenylborate)-tetrahydrofuran complex,

(87) bis(tetramethylcyclopentadienyl)zirconium (trifluoromethanesulfonato) (tetraphenylborate)-tetrahydrofuran complex,

(88) bis(indenyl)zirconium (trifluoromethanesulfonato) (tetraphenylborate)tetrahydrofuran complex,

(89) ethylenebis(indenyl)zirconium (trifluoromethanesulfonato) (tetraphenylborate)-tetrahydrofuran complex, and

(90) isopropylidene-bis(indenyl)zirconium (trifluoromethanesulfonato) (tetraphenylborate)-tetrahydrofuran complex.

Examples of the Group 3, 4, 5, and 6 metal compounds, for example, titanium compounds, hafnium compounds and the like include similar compounds as described above. It is needless to say that a mixture of compounds belonging the same group and/or a mixture of compounds belonging to different groups may also be used.

<Phyllosilicate/Component (B)>

The combination of the metallocene compounds/Component (A) referred to hereinabove with the particulate phyllosilicate mixture referred to hereinbefore will make a catalyst for polymerizing olefins.

<Organoaluminum compound/Component (C)>

In general, the above metallocene compounds of transition metal and a combination thereof with the particulate phyllosilicate mixture of the present invention per se has catalytic activity for the polymerization of an olefin. If necessary, however, an organoaluminum compound may be further used in combination. This can provide a better catalyst for the polymerization of an olefin.

In view of this, the metallocene compounds of transition metals or combinations of the metallocene compounds with particulate phyllosilicate mixtures are herein referred interchangeably to "catalysts" and "catalyst components", the latter being the case where organoaluminum compounds are used as co-catalysts.

Accordingly, the present invention also relates to a catalyst for the polymerization of an olefin, comprising a combination of the above metallocene transition metal compound and the organoaluminum compound with the particulate phyllosilicate mixture. The expression "comprising a combination of" used herein connotes a combination of the above three components and an optional other components.

It is believed that the organoaluminum compound used in the polymerization or in the prepolymerization described hereinbelow in more detail in the present invention inhibits a lowering in catalytic activity caused by water and the like present in the polymerization system and at the same time contributes to an improvement in catalytic activity. Therefore, addition of the organoaluminum compound is one of preferred embodiments.

Organoaluminum compounds usable in the present invention include, for example, those represented by the following formula:

$$AlR^6_j X_{3-j}$$

wherein $R^6$ represents a hydrocarbon group having 1 to 20 carbon atoms, preferably 1 to 10 carbon atoms: X represents hydrogen, a halogen, or an alkoxy group; and j is a number represented by $0<j\leq 3$. Preferred are trialkylaluminums, for example, trimethylaluminum, triethylaluminum, tripropylaluminum, triisobutylaluminum, tri-n-butylaluminum and tri-n-hexylaluminum; alkylaluminum hydride, for example, diethylaluminum hydride, and diisobutylaluminum hydride; halogen- or alkoxy-containing alkylaluminums, for example, diethylaluminum monochloride and diisobutylaluminum monochloride, and diethylaluminum methoxide diisobutylaluminum methoxide; and alkylaluminum amides, for example, diethylaluminum (diethylamide), and diisobutylaluminum (diethylamide). In addition to the above organoaluminum compounds, aluminoxanes, such as methylaluminoxane, can be used. Among them, trialkylaluminums such as triethylaluminum, triisobutylaluminum, tri-n-butylaluminum, and tri-n-hexylaluminum are particularly preferred.

Catalytic components, such as the particulate phyllosilicate mixture, Component (B), the transition metal compound such as metallocene, Component (A), and the optional organoaluminum compound, Component (C), may be brought into contact with one another by any method without particular limitation. In the contact of the catalytic components, a catalytic component other than described above, for example, a solid of a polymer, such as polyethylene or polypropylene, or an inorganic oxide, such as silica or alumina, can be allowed to coexist or brought into contact with the other catalytic components.

The contact of the Components (A), (B) and (C) may be carried out in the following typical sequences.

① Component (A) is contacted with Component (B);

② Component (A) is contacted with Component (B), followed by the contact further with Component (C);

③ Component (A) is contacted with Component (C), followed by the contact further with Component (B);

④ Component (B) is contacted with Component (C), followed by the contact further with Component (A); and ⑤ Components (A), (B) and (C) are contacted each other simultaneously.

The contact may be carried out in an inert gas, such as nitrogen gas, or an inert hydrocarbon solvent, such as pentane, hexane, heptane, toluene, or xylene. The contact temperature is preferably between –20° C. and the boiling point of the solvent, particularly preferably between room temperature and the boiling point of the solvent.

Regarding the amount of the catalytic components used, the amount of the metallocene compound component (A) is 0.0001 to 10 mmol, preferably 0.001 to 5 mmol, per g of the catalyst carrier, viz. particulate phyllosilicate (B). When the organoaluminum component (C) as an optional component is used, the amount of the organoaluminum compound component (C) is not more than 10,000 mmol, preferably 0.0001 to 10,000 mmol, more preferably 0.1 to 100 mmol, per g of the catalyst carrier (B). When the amount of the catalytic components incorporated is expressed in terms of the transition metal in the metallocene compound to the atomic ratio of aluminum in the organoaluminum, the ratio is 1:not more than 1,000,000, preferably 1:0.1 to 10,000.

The catalyst thus obtained may be used either as such without washing or after washing.

<Prepolymerization>

The above catalyst for the polymerization of an olefin according to the present invention can be used, with Component (C) comprised or not comprised, for the polymerization of an olefin, as a catalyst after prepolymerization treatment wherein a minor amount of an olefin having 2 to 20 carbon atoms, preferably 2 to 10 carbon atoms, is thereby polymerized. Olefins usable in the prepolymerization include, for example, ethylene, propylene, 1-butene, 1-hexene, 1-octene, 4-methyl-1-pentene, 3-methyl-1-butene, vinylcycloalkane, styrene and α-methylstyrene, "olefin" thus herein including vinyl aromatics.

In the prepolymerization, if necessary, an organoaluminum component compound (preferably one as described above) may be used in combination with the catalyst. In this case, the amount of the organoaluminum component used is selected so that the atomic ratio of the transition metal in the metallocene compound to the aluminum in the organoaluminum compound is 1:0 to 10,000.

Preferably, the prepolymerization is carried out in an inert solvent which is preferably inert hydrocarbon solvent such as those referred to hereinabove in respect of the contact of Components (A) to (C), under mild conditions such as temperatures of −20° C. to 150° C. Further, preferably, the prepolymerization is carried out so that a polymer in an amount of 0.01 to 1,000 g, preferably 0.05 to 300 g, more preferably 0.1 to 100 g, per g of the solid catalyst is produced.

When the prepolymerization is conducted with ethylene as the olefin to be prepolymerized, the polyethylene formed preferably has a weight average molecular weight of no smaller than 30,000, more preferably no smaller than 50,000. Excessively small molecular weight of the polyethylene prepolymerized would sometimes show poor improvement in particulate characteristics or in prevention of crushing of particles.

The catalysts which have undergone the prepolymerization can be used in the form of slurry as the process product of the prepolymerization, or after being washed, or after being dried into powder preferably at a temperature, e.g. of 0° C. to 100° C. under a reduced pressure or in a dry inert gas flow.

The prepolymerization can be carried out so that solid materials, preferably particulate solid materials, such as polymers such as polypropylenes or inorganic oxides such as silica or alumina are admixed at the time of the prepolymerization or after the prepolymerization product having been dried.

<Use of catalyst for polymerization of olefin/polymerization of olefin>

The catalyst, for the polymerization of an olefin according to the present invention, comprising a combination of a metallocene transition metal compound (A), a particulate phyllosilicate mixture (B), and optionally an organoaluminum compound (C), or the catalyst, for the polymerization of an olefin according to the present invention, obtained by subjecting the above catalyst with or without Component (C) to optional other suitable treatment(s) such as, for example, prepolymerization treatment and/or washing, can be contacted with an α-olefin having 2 to 20 carbon atoms, preferably 2 to 10 carbon atoms, and optionally other monomer(s) copolymerizable with the a-olefin to conduct polymerization (including homopolymerization or copolymerization (either random or block copolymerization)) of the monomer(s).

Specific examples of particularly preferred olefins usable in the polymerization include ethylene, propylene, 1-butene, 1-hexene, 4-methyl-1-pentene, 3-methyl-1-butene, 3-methyl-1-pentene, vinylcycloalkane, ethylidenenorbornene derivatives, styrene, and derivatives of the above olefins.

The polymerization may be carried out in the presence or absence of a solvent, for example, an inert hydrocarbon, such as butane, pentane, hexane, heptane, toluene, or cyclohexane, or a liquefied α-olefin. The temperature is −50° C. to 250° C., preferably 0 to 200° C. Although the pressure is not particularly limited, it is preferably atmospheric pressure to 2000 kgf/cm$^2$.

Polymerization can be conducted in any mode of polymerization such as vapor/gas phase polymerization, slurry polymerization, solution polymerization or high pressure polymerization.

The vapor/gas phase polymerization may be carried out at a temperature of 30° C. to 150° C., preferably 50° C. to 120° C., under a pressure of 1 to 50 kg/cm$^2$.

The slurry polymerization may be carried out in the presence of a solvent or a liquid monomer at a temperature of −20° C. to 150° C., preferably 0° C. to 120° C., under a pressure of 1 to 50 kg/cm$^2$G, preferably 3 to 30 kg/cm$^2$G.

Hydrogen may or may not be used as a molecular weight modifier in the polymerization system. Further, the polymerization can be carried out in a step-wise manner wherein polymerization temperatures, concentration of the molecular weight modifier, and other process conditions are different from step to step.

The use of the catalysts in accordance with the present invention are conducive to production of particulate polymers of a higher bulk density and of improved shape of particles, and, accordingly, the catalysts in accordance with the present invention are used advantageously in the vapor/gas phase polymerization and the slurry polymerization.

The following examples further illustrate the present invention but are not intended to limit it so far as they do not depart from the subject matter of the invention.

In the following examples and comparative example, the melt flow index (hereinafter referred to as "MFR") was measured under conditions of a temperature of 190° C. and a load of 2.16 kg according to the procedure set forth in JIS-6758.

Examples and Comparatives Examples of members suffixed with "a" are those for the first embodiment of the present invention where it is directed to the particulate phyllosilicates of Component (B) with the requirements (a) to (c) are essential corresponding to Japanese Patent Application No. 109173/1997.

EXAMPLE 1a 400 g of a commercially available, swellable synthetic mica ("Somasif ME-100," manufactured by CO-OP CHEMICAL CO., LTD., Japan, average particle diameter 7 μm) was mixed with 100 g of a commercially available, hydrophilic smectite ("SWN," manufactured by CO-OP CHEMICAL CO., LTD., average particle diameter 5 μm) to prepare a mixture. The mixture was dispersed in 2.8 liters of a 2.0 wt % aqueous chromium nitrate solution, and the dispersion was stirred at room temperature for 2 hr. The stirred dispersion was filtered and washed with desalted water. Water was added to the collected solid to prepare a 20.0 wt % water slurry which was then spray dried. Thus, 450 g of particles having an average particle diameter of 54 $\mu$m was prepared. Particles having a diameter of not more than 10 $\mu$m occupied 4% of the total number of the particles, and the particles had a crushing strength of 2.0 MPa and a bulk density of 0.75 g/cc.

EXAMPLE 2a 250 g of a commercially available, swellable synthetic mica ("Somasif ME-100," manufactured by CO-OP CHEMICAL CO., LTD., average particle diameter 7 $\mu$m) was mixed with 250 g of a commercially available, hydrophilic smectite ("SWN," manufactured by CO-OP CHEMICAL CO., LTD., average particle diameter 5 $\mu$m) to prepare a mixture. The mixture was dispersed in 3.0 liters of a 4.0 wt % aqueous chromium nitrate solution, and the dispersion was stirred at room temperature for 2 hr. The stirred dispersion was filtered and washed with desalted water. Water was added to the collected solid to prepare a 20.0 wt % water slurry which was then spray dried. Thus, 420 g of particles having an average particle diameter of 50 $\mu$m was prepared. Particles having a diameter of not more than 10 $\mu$m occupied 2% of the total number of the particles. The particles had a crushing strength of 9.4 MPa and a bulk density of 0.85 g/cc.

EXAMPLE 3a 350 g of a commercially available, swellable synthetic mica ("Somasif ME-100," manufactured by CO-OP CHEMICAL CO., LTD., average particle diameter 7 $\mu$m) was mixed with 150 g of a commercially available, hydrophilic smectite ("SWN," manufactured by CO-OP CHEMICAL CO., LTD., average particle diameter 5 $\mu$m) to prepare a mixture. The mixture was dispersed in 4.0 liters of 3.0 wt % sulfuric acid, and the dispersion was stirred at room temperature for 2 hr. The stirred dispersion was filtered and washed with desalted water. Water was added to the collected solid to prepare a 15.0 wt % water slurry which was then spray dried. Thus, 410 g of particles having an average particle diameter of 40 $\mu$m was prepared. Particles having a diameter of not more than 10 $\mu$m occupied 3% of the total number of the particles. The particles had a crushing strength of 2.7 MPa and a bulk density of 0.76 g/cc.

EXAMPLE 4a 350 g of a commercially available, swellable synthetic mica ("Somasif ME-100," manufactured by CO-OP CHEMICAL CO., LTD., average particle diameter 7 $\mu$m) was mixed with 150 g of commercially available montmorillonite ("Kunipia-F," manufactured by Kunimine Industries (Kogyo) Ltd., Japan, average particle diameter 40 $\mu$m) to prepare a mixture. The mixture was dispersed in 4.0 liters of 3.0 wt % hydrochloric acid, and the dispersion was stirred at room temperature for 2 hr. The stirred dispersion was filtered and washed with desalted water. Water was added to the collected solid to prepare a 15.0 wt % water slurry which was then spray dried. Thus, 400 g of particles having an average particle diameter of 52 $\mu$m was prepared. Particles having a diameter of not more than 10 $\mu$m occupied 5% of the total number of the particles. The particles had a crushing strength of 3.0 MPa and a bulk density of 0.70 g/cc.

EXAMPLE 5a 200 g of a commercially available, swellable synthetic mica ("Na-Teniolite," manufactured by Topy Industries (Kogyo) Co., Ltd., Japan, average particle diameter 10 $\mu$m) was dispersed in 1.0 liter of a 4.0 wt % aqueous chromium nitrate solution, and the dispersion was stirred at room temperature for 2 hr. The stirred dispersion was filtered and washed with desalted water. Water was added to the collected solid to prepare a 30.0 wt % water slurry. 400 ml of a 1.5 wt % water slurry of a commercially available, hydrophilic smectite ("SWN," manufactured by CO-OP CHEMICAL CO., LTD., average particle diameter 12 $\mu$m) was added to the slurry, and the mixture was then spray dried. In this case, the hydrophilic smectite content was 3% by weight. Thus, 150 g of particles having an average particle diameter of 65 $\mu$m was prepared. Particles having a diameter of not more than 10 $\mu$m occupied 0% of the total number of the particles. The particles had a crushing strength of 3.5 MPa and a bulk density of 0.88 g/cc.

COMPARATIVE EXAMPLE 1a 500 g of a commercially available, swellable synthetic mica ("Somasif ME-100," manufactured by CO-OP CHEMICAL CO., LTD., average particle diameter 7 $\mu$m) was dispersed in 2.5 liters of a 2.0 wt % aqueous chromium nitrate solution, and the dispersion was stirred at room temperature for 2 hr. The stirred dispersion was filtered and washed with desalted water. Water was added to the collected solid to prepare a 20.0 wt % water slurry which was then spray dried. Thus, 400 g of particles having an average particle diameter of 60 $\mu$m was prepared. Particles having a diameter of not more than 10 $\mu$m occupied 10% of the total number of the particles. The particles had a crushing strength of 0.1 MPa and a bulk density of 0.55 g/cc.

COMPARATIVE EXAMPLE 2a 500 g of a commercially available, swellable synthetic mica ("Somasif ME-100," manufactured by CO-OP CHEMICAL CO., LTD., average particle diameter 7 $\mu$m) was dispersed in 4.0 liters of 3.0 wt % sulfuric acid, and the dispersion was stirred at room temperature for 2 hr. The stirred dispersion was filtered and washed with desalted water. Water was added to the collected solid to prepare a 15.0 wt % water slurry which was then spray dried. Thus, 370 g of particles having an average particle diameter of 60 $\mu$m was prepared. Particles having a diameter of not more than 10 $\mu$m occupied 12% of the total number of the particles. The particles had a crushing strength of 0.5 MPa and a bulk density of 0.40 g/cc.

COMPARATIVE EXAMPLE 3a 200 g of a commercially available, swellable synthetic mica ("Na-Teniolite," manufactured by Topy Industries, Ltd., average particle diameter 10 $\mu$m) was dispersed in 1.0 liter of a 4.0 wt % aqueous chromium nitrate solution, and the dispersion was stirred at room temperature for 2 hr. The stirred dispersion was filtered and washed with desalted water. Water was added to the collected solid to prepare a 30.0 wt % water slurry. 300 g of a commercially available silica sol ("Cataloid-S S-20L," manufactured by Shokubai Kasei Kogyo (Catalysts and Chemicals Industries) Co., Ltd., average particle diameter 0.02 $\mu$m, SiO$_2$ 20 to 21% by weight) was added to the slurry, and the mixture was then spray dried. In this case, the slurry concentration was 27% by weight, and the silica content was 23% by weight. Thus, 180 g of particles having an average particle diameter of 70 $\mu$m was prepared. Particles having a diameter of not more than 10 $\mu$m occupied 10% of the total number of the particles. The particles had a crushing strength of 0.8 MPa and a bulk density of 0.57 g/cc.

COMPARATIVE EXAMPLE 4a 200 g of a commercially available, swellable synthetic mica ("Na-Teniolite," manufactured by Topy Industries, Ltd., average particle diameter 10 µm) was dispersed in 1.0 liter of a 4.0 wt % aqueous zinc sulfate solution, and the dispersion was stirred at room temperature for 2 hr. The stirred dispersion was filtered and washed with desalted water. Water was added to the collected solid to prepare a 30.0 wt % water slurry. 400 g of a 5.0 wt % aqueous solution of a commercially available binder for ceramics "SMR" (SMR-10M, manufactured by The Shin-Etsu Chemical Co., Ltd., PVA binder) was added to the slurry, and the mixture was then spray dried. In this case, the binder content was 9% by weight. Thus, 170 g of particles having an average particle diameter of 58 µm was prepared. Particles having a diameter of not more than 10 µm occupied 25% of the total number of the particles. The particles had a crushing strength of 0.6 MPa and a bulk density of 0.48 g/cc.

EXAMPLE 6a (1) Production of catalytic component for polymerization of olefin 50 g of the catalyst carrier prepared in Example 1a was placed in a flask and heat dried at 200° C. under reduced pressure (1 to 2 mmHg) for 2 hr.

2.0 g of the heat dried carrier was weighed into a flask having an internal volume of 200 ml in a nitrogen atmosphere, 62 ml of toluene was added thereto, and the mixture was stirred. 8 ml of a previously prepared solution of bis(n-butylcyclopentadienyl)zirconium dichloride in toluene (20 µmol/ml) was added thereto, and the mixture was stirred at room temperature for 10 min, thereby preparing a catalytic component for the polymerization of an olefin.

(2) Polymerization of ethylene 500 ml of heptane and 0.5 mmol of triethylaluminum were successively charged into a 1 liter autoclave purged with nitrogen, and the temperature of the system was raised to 65° C. Ethylene was introduced into the system, the pressure was maintained at 7 kg/cm$^2$, and 80 mg of the catalytic component prepared in the above step (1) was charged into the system to initiate polymerization. The polymerization was continued for 90 min. Thereafter, the gas in the gaseous phase was purged to terminate the polymerization. Thus, 30 g of an ethylene polymer was prepared. The polymer had a bulk density of 0.35 g/cc with the amount of a fine powder having a particle diameter of not more than 105 µm being 0.5%.

EXAMPLE 7a

Copolymerization of ethylene with butene 500 ml of heptane, 30 ml of 1-butene, and 0.5 mmol of triethylaluminum were successively charged into a 1 liter autoclave purged with nitrogen, and the temperature of the system was raised to 65° C. Ethylene was introduced into the system, the pressure was maintained at 22 kg/cm$^2$, and 30 mg of the catalytic component prepared in Example 6a was charged into the system to initiate polymerization. The polymerization was continued for 90 min. Thereafter, the gas in the gaseous phase was purged to terminate the polymerization. Thus, 45 g of an ethylene-butene copolymer was prepared. The ethylene-butene copolymer had a bulk density of 0.34 g/cc with the amount of a fine powder having a particle diameter of not more than 105 µm being 1.2%. Further, it had an MFR of 1.5 and a density of 0.921 g/cc.

EXAMPLE 8a (1) Production of catalytic component for polymerization of olefin 50 g of the catalyst carrier prepared in Example 2a was placed in a flask and heat dried at 200° C. under reduced pressure (1 to 2 mmHg) for 2 hr.

2.0 g of the heat dried carrier was weighed into a flask having an internal volume of 200 ml in a nitrogen atmosphere, 62 ml of toluene was added thereto, and the mixture was stirred. 8 ml of a previously prepared solution of dimethylsilyl-bis(indenyl)zirconium dichloride in toluene (20 µmol/ml) was added thereto, and the mixture was stirred at room temperature for 10 min, thereby preparing a catalytic component for the polymerization of an olefin.

(2) Copolymerization of ethylene with butene

An ethylene-butene copolymer was produced in the same manner as in Example 7a, except that the catalytic component prepared in the above step (1) was used. Thus, 35 g of an ethylene-butene copolymer was prepared. The ethylene-butene copolymer had a bulk density of 0.37 g/cc with the amount of a fine powder having a particle diameter of not more than 105 µm being 0.5%. Further, it had an MFR of 0.8 and a density of 0.923 g/cc.

EXAMPLE 9a

A catalytic component was prepared in the same manner as in Example 6a, except that the catalyst carrier prepared in Example 5a was used. An ethylene-butene copolymer was produced in the same manner as in Example 7a, except that the catalytic component prepared just above was used. Thus, 28 g of an ethylene-butene copolymer was prepared. The ethylene-butene copolymer had a bulk density of 0.36 g/cc with the amount of a fine powder having a particle diameter of not more than 105 µm being 0.2%. Further, it had an MFR of 1.2 and a density of 0.928 g/cc.

COMPARATIVE EXAMPLE 5a

A catalytic component was produced in the same manner as in Example 6a, except that the catalyst carrier prepared in Comparative Example 1a was used. An ethylene polymer was produced in the same manner as in Example 6a, except that the catalyst component prepared just above was used. Thus, 30 g of an ethylene polymer was prepared. The ethylene polymer had a bulk density of 0.14 g/cc with the amount of a fine powder having a particle diameter of not more than 105 µm being 15%.

COMPARATIVE EXAMPLE 6a

An ethylene-butene copolymer was produced in the same manner as in Example 7a, except that the catalytic component prepared in Comparative Example 5a was used. Thus, 40 g of an ethylene-butene copolymer was prepared. The ethylene-butene copolymer had a bulk density of 0.12 g/cc with the amount of a fine powder having a particle diameter of not more than 105 µm being 23%. After the reaction, the wall of the reactor had a fine powder deposited thereon. The polymer thus prepared had an MFR of 1.5 and a density of 0.921 g/cc.

COMPARATIVE EXAMPLE 7a

A catalytic component was produced in the same manner as in Example 6a, except that the catalyst carrier prepared in Comparative Example 3 was used. An ethylene-butene copolymer was produced in the same manner as in Example 7a, except that the catalytic component prepared just above was used. Thus, 10 g of an ethylene-butene copolymer was prepared. The bulk density of the polymer was immeasurable because the amount of the recovered polymer was small due to low catalytic activity of the catalyst for the polymerization. The amount of a fine powder having a particle diameter of not more than 105 μm was 35%, and, after the reaction, the wall of the reactor had a fine powder deposited thereon.

The present invention will further be illustrated by means of further non-limitative examples.

Examples and Comparative Examples of members suffixed with "b" are those for the second embodiment of the present invention where it is directed to catalysts for polymerizing olefines, which catalyst comprises Component (A), a broadened version of Component (B) where the requirements (a) to (c) are not essential and optional Component (C) corresponding to Japanese Patent Application No. 313102/1997.

The process of the catalyst syntheses and the step of the polymerization were carried out under the atmosphere of purified nitrogen. The solvents used were those dehydratively purified by a molecular sieve 4A. The gel permeation chromatography (GPC) was conducted as taught in Takeuchi: "Gel Permeation Chromatography" published by Maruzen, Japan. Thus, use was made of a standard polystyrene of a known molecular weight (monodispersed polystyrene by Toso, Japan), and a number-average molecular weight (Mn) and a weight-average molecular weight (Mw) were obtained by the Universal method, whereby the value of Mw/Mn was obtained. The measurement was carried out by 150C-ALC/GPC by Waters with 3 columns of AD80M/S by Showa Denko, Japan. The sample was diluted in o-dichlorobenzene to 0.2% by weight, and 200 μl of the solution was used at 140° C. and a flow rate of 1 ml/min.

EXAMPLE 1b (1) Production of particulate phyllosilicate mixture 400 g of a commercially available, swellable synthetic mica ("Somasif ME-100," manufactured by CO-OP CHEMICAL CO., LTD., Japan, average particle diameter 7 μm) was mixed with 100 g of a commercially available, hydrophilic smectite ("SWN," manufactured by CO-OP CHEMICAL CO., LTD., average particle diameter 5 μm) to prepare a mixture. The mixture was dispersed in 2.8 liters of a 2.0 wt % aqueous chromium nitrate solution, and the dispersion was stirred at room temperature for 2 hr. The stirred dispersion was filtered and washed with desalted water. Water was added to the collected solid to prepare a 20.0 wt % water slurry which was then spray dried. Thus, 450 g of particles having an average particle diameter of 54 μm was prepared. Particles having a diameter of not more than 10 μm occupied 4% of the total number of the particles, and the particles had a crushing strength of 2.0 MPa and a bulk density of 0.75 g/cc.

(2) Production of catalyst component

Into a reaction vessel of 10 liter capacity equipped with a stirring means were added 4.4 liters of n-heptane, 150 g of the particulate phyllosilicate mixture prepared in the paragraph (1) just above which had undergone drying under reduced pressure at 200° C. for 2 hrs., and 12.0 mmol of (n-butylcyclopentadienyl)zirconium dichloride dissolved in 600 ml of n-heptane, and the mixture was agitated at room temperature for 10 mins.

(3) Prepolymerization

To the mixture under stirring was added 24 mmol of triethylaluminum and the temperature was adjusted to 60° C. Ethylene gas was then introduced for 2 hrs. to polymerize. After the reaction, the product was washed with heptane, left standing and the solvent was decanted off. The product was then dried at 70° C. under reduced pressure. The amount of polyethylene formed was 1050 g, the weight average molecular weight being 188,900.

(4) Copolymerization of ethylene with butene

To an autoclave of one liter capacity purged with nitrogen were added sequentially 500 ml of heptane, 60 ml of 1-butene and 0.5 mmol of triethylaluminum, and the temperature was raised to 65° C. The catalyst which had undergone the prepolymerization in (3) just above in an amount corresponding to 20.0 mg of the silicate mixture together with ethylene, and polymerization was carried out at an ethylene pressure maintained at 20.0 kg/cm²G for 60 min. The ethylene in the gas phase was purged to terminate polymerization. 46 g of copolymer in spherical particles of ethylene with butene was obtained. The bulk density of the copolymer was 0.38 g/cc and no fines of particle size no larger than 106 μm were observed. The weight average molecular weight was 125,000.

COMPARATIVE EXAMPLE 1b

The procedure set forth in Example 1a was followed except for the (3) prepolymerization being omitted thereby to produce a copolymer of ethylene with butene.

A copolymer in spherical particles was obtained in an amount of 48 g, which had a bulk density of 0.22 g/cc with a content of fines of a particle size of up to 106 μm of 4.0%.

EXAMPLE 2b (1) Production of catalyst

The procedures set forth in Example 1b (2) and (3) were followed except for the use as a metallocene complex of bis(1,3-dimethylcyclopentadienyl)zirconium dichloride thereby to carry out the production of a catalyst component and the prepolymerization. The polyethylene formed was in an amount of 750 g and had a weight average molecular weight of 93,500.

(4) Copolymerization of ethylene with hexene

To an autoclave of a one liter capacity purged with nitrogen were added 430 ml of heptane, 70 ml of 1-hexene and 0.5 mmol of triethylaluminum, and the temperature was raised to 65° C. The catalyst which had undergone the prepolymerization obtained in (1) just above was added in an amount corresponding to 20.0 mg of the silicate mixture together with ethylene, and polymerization was carried out at a total pressure maintained at 22.0 kg/cm²G for 60 mins. The ethylene in the gas phase was purged to terminate polymerization. 38.4 g of a copolymer in spherical particles of ethylene with hexene was obtained, which had the bulk density of 0.35 g/cc with a content of fines of a particle size of up to 106 μm of 0.5% and the weight average molecular weight of 255,500.

EXAMPLE 3b (1) Production of particulate phyllosilicate mixture 350 g of a commercially available, swellable synthetic mica ("Somasif ME-100," manufactured by CO-OP CHEMICAL CO., LTD., average particle diameter 7 μm) was mixed with 150 g of a commercially available, hydrophilic smectite ("SWN," manufactured by CO-OP CHEMICAL CO., LTD., average particle diameter 5 μm) to prepare a mixture. The mixture was dispersed in 4.0 liters of 3.0 wt % sulfuric acid, and the dispersion was stirred at room temperature for 2 hr. The stirred dispersion was filtered and washed with desalted water. Water was added to the collected solid to prepare a 15.0 wt % water slurry which was then spray dried. Thus, 410 g of particles having an average particle diameter of 40 μm was prepared. Particles having a diameter of not more than 10 μm occupied 3% of the total number of the particles. The particles had a crushing strength of 2.7 MPa and a bulk density of 0.76 g/cc.

(2) Production of catalyst

A catalyst was prepared and prepolymerization was carried out as in Example 1b (2) and (3). The polyethylene formed was in an amount of 1050 g and had a weight average molecular weight of 145,000.

(3) Copolymerization of ethylene with hexene

Copolymerization of ethylene with hexene was carried out as in Example 2b. As a result, a copolymer of ethylene with hexene in spherical particles was obtained in an amount of 32 g. The copolymer had a bulk density of 0.40 g/cc with no fines of a particle size no higher than 106 μm observed.

COMPARATIVE EXAMPLE 2b

The procedure set forth in Example 3b was followed except for the (3) prepolymerization being omitted thereby to produce a copolymer of ethylene with hexene.

A copolymer in spherical particles was obtained in an amount of 28.8 g, which had a bulk density of 0.24 g/cc with a content of fines of a particle size of up to 106 μm of 1.5%.

EXAMPLE 4b (1) Production of particulate phyllosilicate mixture 200 g of a commercially available, swellable synthetic mica ("Na-Teniolite," manufactured by Topy Industries (Kogyo) Co., Ltd., Japan, average particle diameter 10 μm) was dispersed in 1.0 liter of a 4.0 wt % aqueous chromium nitrate solution, and the dispersion was stirred at room temperature for 2 hr. The stirred dispersion was filtered and washed with desalted water. Water was added to the collected solid to prepare a 30.0 wt % water slurry. 400 ml of a 1.5 wt % water slurry of a commercially available, hydrophilic smectite ("SWN," manufactured by CO-OP CHEMICAL CO., LTD., average particle diameter 12 μm) was added to the slurry, and the mixture was then spray dried. In this case, the hydrophilic smectite content was 3% by weight. Thus, 150 g of particles having an average particle diameter of 65 μm was prepared. Particles having a diameter of not more than 10 μm occupied 0% of the total number of the particles. The particles had a crushing strength of 3.5 MPa and a bulk density of 0.88 g/cc.

(2) Production of catalyst

A catalyst was produced as in Example 1b (2) except for the use of the particulate phyllosilicate mixture obtained in (1) just above.

(3) Prepolymerization

Prepolymerization was carried out as in Example 1b (3) except for the use of the catalyst component obtained in (2) just above.

(4) Copolymerization of ethylene with butene

Copolymerization of ethylene with butene was carried out as in Example 1b (4) except for the use of the catalyst which had undergone the prepolymerization as in (3) just above thereby to produce 40 g of a copolymer. The copolymer had a bulk density of 0.38 g/cc with a content of fines of a particle size up to 106 μm of 0.3%.

COMPARATIVE EXAMPLE 3b

The procedure set forth in Example 4b was followed except for the (3) prepolymerization being omitted thereby to produce a copolymer of ethylene with butene.

A copolymer in spherical particles was obtained in an amount of 36 g, which had a bulk density of 0.28 g/cc with a content of fines of a particle size of up to 106 μm of 1.8%.

Examples and Comparative Examples of numbers suffixed with "c" are those for the third embodiment of the present invention which is distinct from the second embodiment in that the Component (C) and the prepolymerization are not essential corresponding to Japanese Patent Application No. 313103/1997.

EXAMPLE 1c (1) Production of particulate phyllosilicate mixture 400 g of a commercially available, swellable synthetic mica ("Somasif ME-100," manufactured by CO-OP CHEMICAL CO., LTD., Japan, average particle diameter 7 μm) was mixed with 100 g of a commercially available, hydrophilic smectite ("SWN," manufactured by CO-OP CHEMICAL CO., LTD., average particle diameter 5 μm) to prepare a mixture. The mixture was dispersed in 2.8 liters of a 2.0 wt % aqueous chromium nitrate solution, and the dispersion was stirred at room temperature for 2 hr. The stirred dispersion was filtered and washed with desalted water. Water was added to the collected solid to prepare a 20.0 wt % water slurry which was then spray dried. Thus, 450 g of particles having an average particle diameter of 54 μm was prepared. Particles having a diameter of not more than 10 μm occupied 4% of the total number of the particles, and the particles had a crushing strength of 2.0 MPa and a bulk density of 0.75 g/cc.

(2) Production of catalyst for polymerizing olefin 50 g of the particulate phyllosilicate mixture prepared in (1) just above was placed in a flask and heat dried at 200° C. under reduced pressure (1 to 2 mmHg) for 2 hr.

2.0 g of the heat dried carrier was weighed into a flask having an internal volume of 200 ml in a nitrogen atmosphere, 62 ml of toluene was added thereto, and the mixture was stirred. 8 ml of a previously prepared solution of bis(n-butylcyclopentadienyl)zirconium dichloride in toluene (20 μmol/ml) was added thereto, and the mixture was stirred at room temperature for 10 min, thereby preparing a catalytic component for the polymerization of an olefin.

(2) Polymerization of ethylene 500 ml of heptane and 0.5 mmol of triethylaluminum were successively charged into a 1 liter autoclave purged with nitrogen, and the temperature of the system was raised to 65° C. Ethylene was introduced into the system, the pressure was maintained at 7 kg/cm$^2$, and 80 mg of the catalytic component prepared in the above step (1) was charged into the system to initiate polymerization. The polymerization was continued for 90 min. Thereafter, the gas in the gaseous phase was purged to terminate the polymerization. Thus, 30 g of an ethylene polymer was prepared. The polymer had a bulk density of 0.35 g/cc with, upon sieving, the amount of a fine powder having a particle diameter of not more than 105 μm being 0.5%. The sieving also showed that the average particle diameter was 680 μm.

COMPARATIVE EXAMPLE 1c (1) Production of particulate phyllosilicate 500 g of a commercially available, swellable synthetic mica ("Somasif ME-100," manufactured by CO-OP CHEMICAL CO., LTD., average particle diameter 7 μm) was dispersed in 2.5 liters of a 2.0 wt % aqueous chromium nitrate solution, and the dispersion was stirred at room temperature for 2 hr. The stirred dispersion was filtered and washed with desalted water. Water was added to the collected solid to prepare a 20.0 wt % water slurry which was then spray dried. Thus, 400 g of particles having an average particle diameter of 60 μm was prepared. Particles having a diameter of not more than 10 μm occupied 10% of the total number of the particles. The particles had a crushing strength of 0.1 MPa and a bulk density of 0.55 g/cc.

(2) Production of catalyst for polymerizing olefin and polymerization of ethylene The procedure set forth in Example 1c was followed except for the use of the particulate phyllosilicate prepared in (1) just above thereby to produce a catalyst and carry out polymerization of ethylene. As a result, an ethylene polymer was obtained in an amount of 30 g of a bulk density of 0.14 g/cc and of an average particle diameter of 750 μm with fines of particle size of up to 105 μm of 15%.

EXAMPLE 2c (1) Production of particulate phyllosilicate mixture 250 g of a commercially available, swellable synthetic mica ("Somasif ME-100," manufactured by CO-OP CHEMICAL CO., LTD., average particle diameter 7 un) was mixed with 250 g of a commercially available, hydrophilic smectite ("SWN," manufactured by CO-OP CHEMICAL CO., LTD., average particle diameter 5 μm) to prepare a mixture. The mixture was dispersed in 3.0 liters of a 4.0 wt % aqueous chromium nitrate solution, and the dispersion was stirred at room temperature for 2 hr. The stirred dispersion was filtered and washed with desalted water. Water was added to the collected solid to prepare a 20.0 wt % water slurry which was then spray dried. Thus, 420 g of particles having an average particle diameter of 50 μm was prepared. Particles having a diameter of not more than 10 μm occupied 2% of the total number of the particles. The particles had a crushing strength of 9.4 MPa and a bulk density of 0.85 g/cc.

(2) Production of catalytic component for polymerization of olefin 50 g of the catalyst carrier prepared in (1) just above was placed in a flask and heat dried at 200° C. under reduced pressure (1 to 2 mmHg) for 2 hr.

2.0 g of the heat dried carrier was weighed into a flask having an internal volume of 200 ml in a nitrogen atmosphere, 62 ml of toluene was added thereto, and the mixture was stirred. 8 ml of a previously prepared solution of dimethylsilyl-bis(indenyl)zirconium dichloride in toluene (20 μmol/ml) was added thereto, and the mixture was stirred at room temperature for 10 min, thereby preparing a catalytic component for the polymerization of an olefin.

(3) Copolymerization of ethylene with butene 500 ml of heptane, 30 ml of 1-butene, and 0.5 mmol of triethylaluminum were successively charged into a 1 liter autoclave purged with nitrogen, and the temperature of the system was raised to 65° C. Ethylene was introduced into the system, the pressure was maintained at 22 kg/cm$^2$G, and 30 mg of the catalytic component prepared in (2) just above was charged into the system to initiate polymerization. The polymerization was continued for 90 min. Thereafter, the gas in the gaseous phase was purged to terminate the polymerization. Thus, 45 g of an ethylene-butene copolymer was prepared. The ethylene-butene copolymer had a bulk density of 0.34 g/cc and an average particle diameter of 860 μm with the amount of a fine powder having a particle diameter of not more than 105 μm being 1.2%. Further, it had an MFR of 2.5 and a density of 0.927 g/cc.

COMPARATIVE EXAMPLE 2c

A catalyst and an ethylene-butene copolymer were produced in the same manner as in Example 2c, except that the catalytic component prepared in Comparative Example 1c (1) was used. Thus, 40 g of an ethylene-butene copolymer was prepared. The ethylene-butene copolymer had a bulk density of 0.12 g/cc of an average particle diameter of 900 μm with the amount of a fine powder having a particle diameter of not more than 105 μm being 23%. After the reaction, the wall of the reaction had a fine powder deposited thereon. The polymer thus prepared had an MFR of 1.5 and a density of 0.921 g/cc.

EXAMPLE 3c (1) Production of particulate phyllosilicate mixture 350 g of a commercially available, swellable synthetic mica ("Somasif ME-100," manufactured by CO-OP CHEMICAL CO., LTD., average particle diameter 7 μm) was mixed with 150 g of a commercially available, hydrophilic smectite ("SWN," manufactured by CO-OP CHEMICAL CO., LTD., average particle diameter 5 μm) to prepare a mixture. The mixture was dispersed in 4.0 liters of 3.0 wt % sulfuric acid, and the dispersion was stirred at room temperature for 2 hr. The stirred dispersion was filtered and washed with desalted water. Water was added to the collected solid to prepare a 15.0 wt % water slurry which was then spray dried. Thus, 410 g of particles having an average particle diameter of 40 μm was prepared. Particles having a diameter of not more than 10 μm occupied 3% of the total number of the particles. The particles had a crushing strength of 2.7 MPa and a bulk density of 0.76 g/cc.

(2) Production of catalyst for polymerization of olefin 50 g of the particulate phyllosilicate prepared in (1) just above was placed in a flask and heat dried at 200° C. under reduced pressure (1 to 2 mmHg) for 2 hr.

2.0 g of the heat dried carrier was weighed into a flask having an internal volume of 200 ml in a nitrogen atmosphere, 62 ml of toluene was added thereto, and the miture was stirred. 8 ml of a previously prepared solution of bis(n-butylcyclopentadienyl)zirconium dichloride in toluene (20 μmol/ml) was added thereto, and the mixture was stirred at room temperature for 10 min, thereby preparing a catalytic component for the polymerization of an olefin.

(3) Copolymerization of ethylene with butene 500 ml of heptane, 60 ml of 1-butene, and 0.5 mmol of triethylaluminum were successively charged into a 1 liter autoclave purged with nitrogen, and the temperature of the system was raised to 65° C. Ethylene was introduced into the system, the pressure was maintained at 22 kg/cm$^2$, and 30 mg of the catalyst prepared in (2) just above was charged into the system to initiate polymerization. The polymerization was continued for 90 min. Thereafter, the gas in the gaseous phase was purged to terminate the polymerization. Thus, 45 g of an ethylene-butene copolymer was prepared. The ethylene-butene copolymer had a bulk density of 0.32 g/cc and an average particle diameter of 700 μm with the amount of a fine powder having a particle diameter of not more than 105 μm being 0.8%.

COMPARATIVE EXAMPLE 3c (1) Production of particulate phyllosilicate 500 g of a commercially available, swellable synthetic mica ("Somasif ME-100," manufactured by CO-OP CHEMICAL CO., LTD., average particle diameter 7 μm) was dispersed in 4.0 liters of 3.0 wt % sulfuric acid, and the dispersion was stirred at room temperature for 2 hr. The stirred dispersion was filtered and washed with desalted water. Water was added to the collected solid to prepare a 15.0 wt % water slurry which was then spray dried. Thus, 370 g of particles having an average particle diameter of 60 μm was prepared. Particles having a diameter of not more than 10 μm occupied 12% of the total number of the particles. The particles had a crushing strength of 0.5 MPa and a bulk density of 0.40 g/cc.

(2) Catalyst for polymerizing olefin and copolymerization of ethylene with butene A catalyst and an ethylene-butene copolymer were produced in the same manner as in Example 3c, except that the particulate phyllosilicate prepared in (1) just above was used. Thus, 30 g of an ethylene-butene copolymer was prepared. The ethylene-butene copolymer had a bulk density of 0.22 g/cc and an average particle diameter of 900 μm with the amount of a fine powder having a particle diameter of not more than 105 μm being 4.2%.

EXAMPLE 4c (1) Production of particulate phyllosilicate mixture 200 g of a commercially available, swellable synthetic mica ("Na-Teniolite," manufactured by Topy Industries Ltd., average particle diameter 10 μm) was dispersed in 1.0 liter of a 4.0 wt % aqueous chromium nitrate solution, and the dispersion was stirred at room temperature for 2 hr. The stirred dispersion was filtered and washed with desalted water. Water was added to the collected solid to prepare a 30.0 wt % water slurry. 400 ml of a 1.5 wt % water slurry of a commercially available, hydrophilic smectite ("SWN," manufactured by CO-OP CHEMICAL CO., LTD., average particle diameter 12 μm) was added to the slurry, and the mixture was then spray dried. In this case, the hydrophilic smectite content was 3% by weight. Thus, 150 g of particles having an average particle diameter of 65 μm was prepared. Particles having a diameter of not more than 10 μm occupied 0% of the total number of the particles. The particles had a crushing strength of 3.5 MPa and a bulk density of 0.88 g/cc.

(2) Catalyst for polymerizing olefin and copolymerization of ethylene with butene A catalyst and an ethylene-butene copolymer were produced in the same manner as in Example 3c, except that the particulate phyllosilicate mixture in (1) just above was used. Thus, 28 g of an ethylene-butene copolymer was prepared. The ethylene-butene copolymer had a bulk density of 0.36 g/cc and an average particle diameter of 650 μm with the amount of a fine powder having a particle diameter of not more than 105 μm being 0.2%.

COMPARATIVE EXAMPLE 4c (1) Production of particulate phyllosilicate 200 g of a commercially available, swellable synthetic mica ("Na-Tenolite," manufactured by Topy Industries Ltd., average particle diameter 10 μm) was dispersed in 1.0 liter of a 4.0 wt % aqueous chromium nitrate solution, and the dispersion was stirred at room temperature for 2 hr. The stirred dispersion was filtered and washed with desalted water. Water was added to the collected solid to prepare a 30.0 wt % water slurry. Thus, 180 g of particles having an average particle diameter of 70 μm was prepared. Particles having a diameter of not more than 10 μm occupied 10% of the total number of the particles. The particles had a crushing strength of 0.2 MPa and a bulk density of 0.40 g/cc.

(2) Catalyst for polymerizing olefin and copolymerization of ethylene with butene A catalyst and an ethylene-butene copolymer were produced in the same manner as in Example 3c, except that the particulate phyllosilicate prepared in (1) just above was used. Thus, 25 g of an ethylene-butene copolymer was prepared. The ethylene-butene copolymer had a bulk density of 0.22 g/cc and an average particle diameter of 820 μm with the amount of a fine powder having a particle diameter of not more than 105 μm being 7.3%.

COMPARATIVE EXAMPLE 5c (1) Production of particulate phyllosilicate 200 g of a commercially available, swellable synthetic mica ("Na-Teniolite," manufactured by Topy Industries, Ltd., average particle diameter 10 μm) was dispersed in 1.0 liter of a 4.0 wt % aqueous chromium nitrate solution, and the dispersion was stirred at room temperature for 2 hr. The stirred dispersion was filtered and washed with desalted water. Water was added to the collected solid to prepare a 30.0 wt % water slurry. 300 g of a commercially available silica sol ("Cataloid-S S-20L," manufactured by Shokubai Kasei Industries Co., Ltd., average particle diameter 0.02 μm, $SiO_2$ 20 to 21% by weight) was added to the slurry, and the mixture was then spray dried. In this case, the slurry concentration was 27% by weight, and the silica content was 23% by weight. Thus, 180 g of particles having an average particle diameter of 70 μm was prepared. Particles having a diameter of not more than 10 μm occupied 10% of the total number of the particles. The particles had a crushing strength of 0.8 MPa and a bulk density of 0.57 g/cc.

(2) Catalyst for polymerizing olefin and copolymerization of ethylene with butene A catalyst and an ethylene-butene copolymer were produced in the same manner as in Example 3c, except that the particulate phyllosilicate prepared in (1) just above was used. Thus, 20 g of an ethylene-butene copolymer was prepared. The ethylene-butene copolymer had a bulk density of 0.24 g/cc and an average particle diameter of 780 μm with the amount of a fine powder having a particle diameter of not more than 105 μm being 3.2%.

COMPARATIVE EXAMPLE 6c (1) Production of particulate phyllosilicate 200 g of a commercially available, swellable synthetic mica ("Na-Teniolite," manufactured by Topy Industries, Ltd., average particle diameter 10 μm) was dispersed in 1.0 liter of a 4.0 wt % aqueous zinc sulfate solution, and the dispersion was stirred at room temperature for 2 hr. The stirred dispersion was filtered and washed with desalted water. Water was added to the collected solid to prepare a 30.0 wt % water slurry. 400 g of a 5.0 wt % aqueous solution of a commercially available binder for ceramics "SMR" (SMR-10M, manufactured by The Shin-Etsu Chemical Co., Ltd., PVA binder) was added to the slurry, and the mixture was then spray dried. In this case, the binder content was 9% by weight. Thus, 170 g of particles having an average particle diameter of 58 μm was prepared. Particles having a diameter of not more than 10 μm occupied 25% of the total number of the particles. The particles had a crushing strength of 0.6 MPa and a bulk density of 0.48 g/cc.

(2) Catalyst for polymerizing olefin and copolymerization of ethylene with butene A catalyst and an ethylene-butene copolymer were produced in the same manner as in Example 3c, except that the particulate phyllosilicate in (1) just above was used. Thus, 20 g of an ethylene-butene copolymer was prepared. The ethylene-butene copolymer had a bulk density of 0.19 g/cc and an average particle diameter of 710 μm with the amount of a fine powder having a particle diameter of not more than 105 μm being 10%.

EXAMPLE 5c (1) Production of catalyst for polymerization of olefin 50 g of the particulate phyllosilicate prepared in Example 1c (1) was placed in a flask and heat dried at 200° C. under reduced pressure (1 to 2 mmHg) for 2 hr.

2.0 g of the heat dried carrier was weighed into a flask having an internal volume of 200 ml in a nitrogen atmosphere, 62 ml of toluene was added thereto, and the mixture was stirred followed by addition of 12 mmol of triethylaluminum. The mixture was stirred for 2 hrs, followed by decantation and washing with toluene through decantation.

37.5 ml of a previously prepared solution of dimethylsilyl-bis(2-methyl-4-phenylindenyl)zirconium dichloride in toluene (20 μmol/ml) and thereafter 7.5 mmol of triisobutylaluminum were added thereto, and the mixture was stirred at room temperature for 30 min, thereby preparing a catalyst for the polymerization of an olefin.

(2) Bulk polymerization of propylene

To an autoclave of a capacity of 1 liter purged with nitrogen were added 500 ml of propylene and then 0.5 mmol of triisobutylaluminum, and the temperature was raised to 75° C. The catalyst was added in an amount corresponding to 15 mg of the particulate phyllosilicate mixture was added thereby to initiate polymerization. The polymerization was carried out for 2 hr. Ethanol was added to terminate polymerization. The polypropylene obtained was in an amount of 32 g and found, upon determination of particle diameter, to have an average particle diameter of 720 μm, fines of particle size of up to 105 μm was 0.5% and the bulk density was 0.45 g/cc.

The experimentation is summarized in the following Tables.

TABLE 3

Particulate polymer

| | Average particle diameter (μm) | Content of particles of diameter up to 105 (μm) (%) | Bulk density (g/cc) |
|---|---|---|---|
| Ex. 1 | 680 | 0.5 | 0.35 |
| Ex. 2 | 860 | 1.2 | 0.34 |
| Ex. 3 | 700 | 0.8 | 0.32 |
| Ex. 4 | 650 | 0.2 | 0.36 |
| Ex. 5 | 720 | 0.5 | 0.45 |
| Comp. Ex. 1 | 750 | 15 | 0.14 |
| Comp. Ex. 2 | 900 | 23 | 0.12 |
| Comp. Ex. 3 | 900 | 4.2 | 0.22 |
| Comp. Ex. 4 | 820 | 7.3 | 0.22 |
| Comp. Ex. 5 | 780 | 3.2 | 0.24 |
| Comp. Ex. 6 | 710 | 10 | 0.19 |

Examples and Comparative Examples of numbers suffixed with "d" are those for the fourth embodiment of the present invention wherein the solvent-free polymerization over a catalyst comprising Component (A), the broader version of Component (B) and optional Component (C) is essential corresponding to Japanese Patent Application No. 313104/1997. The steps of catalyst syntheses and of polymerization were carried out under the purified nitrogen. The solvents used were dehydratively purified.

EXAMPLE 1d (1) Production of particulate phyllosilicate mixture 400 g of a commercially available, swellable synthetic mica ("Somasif ME-100," manufactured by CO-OP CHEMICAL CO., LTD., average particle diameter of 7 μm) was mixed with 100 g of a commercially available, hydrophilic smectite ("SWN," manufactured by CO-OP CHEMICAL CO., LTD., average particle diameter 5 μm) to prepare a mixture. The mixture was dispersed in 2.8 liters of a 2.0 wt % aqueous chromium nitrate solution, and the dispersion was stirred at room temperature for 2 hr. The stirred disper-

TABLE 1

Particulate phyllosilicate

| Examples | Smectite content (%) | Average particle diameter (μm) | Content of particles of particle diameter up to 10 μm (%) | Crushing strength (MPa) | Bulk density (g/cc) |
|---|---|---|---|---|---|
| Ex. 1 | 20 | 54 | 4 | 2.0 | 0.75 |
| Ex. 2 | 50 | 50 | 2 | 9.4 | 0.85 |
| Comp. Ex. 1 | — | 60 | 10 | 0.1 | 0.55 |
| Ex. 3 | 30 | 40 | 3 | 2.7 | 0.76 |
| Comp. Ex. 3 | — | 60 | 12 | 0.5 | 0.40 |
| Ex. 4 | 3 | 65 | 0 | 3.5 | 0.88 |
| Comp. Ex. 4 | — | 70 | 10 | 0.2 | 0.40 |

TABLE 2

Particulate phyllosilicate

| Examples | Additive | Average particle diameter (μm) | up to 10 μm (%) | Crushing strength (MPa) | Bulk density (g/cc) |
|---|---|---|---|---|---|
| Ex. 4 | SWN (3%) | 65 | 0 | 3.5 | 0.88 |
| Comp. Ex. 5 | SiO$_2$ (23%) | 70 | 10 | 0.8 | 0.57 |
| Comp. Ex. 6 | PVA (9%) | 58 | 25 | 0.6 | 0.48 | sion was filtered and washed with desalted water. Water was added to the collected solid to prepare a 20.0 wt % water slurry which was then spray dried. Thus, 450 g of particles having an average particle diameter of 54 μm was prepared. Particles having a diameter of not more than 10 μm occupied 4% of the total number of the particles, and the particles had a crushing strength of 2.0 MPa and a bulk density of 0.75 g/cc.

(2) Production of catalyst

To a reaction vessel of a capacity of 10 liters equipped with a stirrer were added 4.4 liter of n-heptane, 150 g of the particulate phyllosilicate prepared in (1) just above which had previously been dried at 200° C. under reduced pressure for 2 hrs, and 12.0 mmol of bis(n-butylcyclopentadienyl) zirconium dichloride dissolved in 600 ml of n-heptane, and the mixture was agitated at room temperature for 10 mins.

(3) Prepolymerization

To the mixture under agitation was added 24 mmol of triethylaluminum, and the temperature of the system was raised to 60° C. Ethylene gas was then introduced and the reaction was carried out for 2 hrs. The amount of polyethylene formed during the reaction was 1,050 g.

(4) Vapor phase copolymerization of ethylene with butene

To a stainless steel autoclave equipped with an induction stirrer which had previously been dried under nitrogen flow at 100° C. for 30 min. of a capacity of 1.0 liter was added 100 g of dried sodium chloride and the autoclave was thoroughly purged with dried nitrogen. To the autoclave were added 2.0 mmol of triethylaluminum followed by a gaseous mixture of ethylene and butene, the butene/ethylene being 6 mole % so that the total pressure became 20 kg/cm$^2$G. The temperature of the system was raised to 80° C., and the solid catalyst prepared in (3) just above was added in an amount of 50 mg corresponding to the weight where amount of the polyethylene was excluded thereby to initiate polymerization. The polymerization temperature was maintained at a constant level and the gaseous mixture of ethylene and butene was continuously fed to continue polymerization for 1 hr. with the $H_2$ concentration in the gas phase maintained at 50 ppm. The unreacted gas was purged to terminate polymerization. The content of the autoclave gave, upon removal of sodium chloride, 42 g of polymer powder. The polymer powder obtained consisted of spherical particles, having a bulk density of 0.34 g/cc with a content of fines of a particle diameter up to 106 μm of 0.1% by weight. The polymer obtained had an MFR of 1.2 and a density of 0.920 g/cc.

EXAMPLE 2d (1) Production of particulate phyllosilicate mixture

Commercially available swellable synthetic mica ("Na-Teniolite," Topy Industries Ltd.) in an amount of 200 g was dispersed in 1.0 liter of 4.0% by weight chromium nitrate aqueous solution, and the dispersion formed was agitated at room temperature for 2 hrs. The slurry was filtered and the cake was washed with desalted water. The cake was reslurried in water into an aqueous slurry of 30.0% by weight of the solid content. To the slurry thus formed was S added commercially available hydrophilic smectite ("SWN", CO-OP Chemical) in an aqueous slurry in water of a solid content of 1.5% by weight in an amount of 400 ml, and the mixture was spray dried. The spray-dried product comprised 3% by weight of the hydrophilic smectite. A particulate phyllosilicate of an average particle diameter of 65 μm in an amount of 150 g was obtained with the fines of particle diameter up to 10 μm of 0.0%, the crushing strength of 3.5 MPa and a bulk density of 0.88 g/cc.

(2) Production of catalyst

A catalyst was produced as in Example 1d (2) except that the particulate phyllosilicate prepared in (1) just above was used.

(3) Prepolymerization

Prepolymerization was carried out as in Example Id (3) on the catalyst component prepared as in (2) just above.

(4) Copolymerization of ethylene with butene

Copolymerization of ethylene with butene was carried out as in Example 1d (4) with the catalyst having undergone prepolymerization as in (3) just above. The polymer powder obtained in an amount of 33 g had a bulk density of 0.32 g/cc with a content of fines of a particle size of up to 106 μm of 0.6%.

EXAMPLE 3d (1) Vapor/gas phase continuous copolymerization of ethylene with butene Into a continuous vapor phase polymerization vessel wherein a gaseous mixture of ethylene and butene of a 1-butene/ethylene of 6.0 mole % was circulated was intermittently added the catalyst which had undergone prepolymerization as in Example 1d (3) in a rate of 1349 mg/hr, and 628 mg/1 hr of triethylaluminum. The conditions for polymerization were a temperature of 88° C., an ethylene pressure of 18 kg/cm$^2$G and an average residence time of 5.5 hrs, and polyethylene was formed in an average polymerization rate of 8.6 kg/hr. The polyethylene obtained consisted of all of spherical particles having a bulk density of 0.34 g/cc with fines of particles of a diameter of up to 106 μm of 0.2%.

COMPARATIVE EXAMPLE 1d (1) Production of particulate phyllosilicate

Commercially available swellable synthetic mica ("Somasif ME-100," CO-OP Chemical Co., Ltd. average particle diameter of 7 μm) in an amount of 500 g was dispersed in 2.5 liter of 2.0% by weight aqueous chromium nitrate solution, and the dispersion formed was agitated at temperature for 2 hrs. The dispersion was then filtered and the cake was washed with desalted water. The cake was reslurried in water into a slurry of 20.0% by weight solid, which was then spray dried. As a result, particulate product was obtained of an average particle diameter of 60 μm in an amount of 400 g. The number of particles of a particle diameter of up to 10 μm occupied 10% of the total particles, and the crush strength was 0.1 MPa and the bulk density was 0.55 g/cc.

(2) Production of catalyst

Catalyst was produced as in Example 1d (2) with the particulate phyllosilicate prepared in (1) just above.

(3) Prepolymerization

Prepolymerization was carried out as in Example 1d (3) on the catalyst component prepared in (2) just above.

(4) Copolymerization of ethylene with butene

Copolymerization of ethylene with butene was carried out as in Example 1d (4) on the catalyst having undergone prepolymerization as in (3) just above. As a result, 43 g of polymer powder was obtained. The polymer had a lot of non-uniform particles, a bulk density of 0.13 g/cc with a content of fines of a particle diameter of up to 106 μm of 7.5%.

COMPARATIVE EXAMPLE 2d (1) Production of particulate phyllosilicate

Commercially available swellable synthetic mica ("Na-teniolite", Topy Industries) in an amount of 200 g was dispersed in 1.0 liter of a 4.0% by weight chromium nitrate aqueous solution and the dispersion was agitated at room temperature for 2 hrs. The dispersion was filtered and the cake was washed with desalted water. The cake was reslurried in water into a slurry of 30.0% by weight solid, which was then spray dried. As a result, a particulate product was obtained of an average particle size 70 μm in an amount of 180 g. The number of particles of a particle size of up to 10 μm occupied 10% of the total particles, and the crush strength was 0.2 MPa and the bulk density was 0.40 g/cc.

(2) Production of catalyst

Catalyst was produced as in Example 1d (2) with the particulate phyllosilicate prepared in (1) just above.

(3) Prepolymerization

Prepolymerization was carried out as in Example 1d (3) on the catalyst component produced in (2) just above.

(4) Copolymerization of ethylene with butene

Copolymerization of ethylene with butene was carried out as in Example 1d (4) with the catalyst having undergone prepolymerization as in (3) just above. As a result, 35 g of polymer powder was obtained. The polymer powder comprised a lot of flaky or non-uniform particles, and the bulk density was 0.11 g/cc with a content of fines of a particle size of up to 106 μm of 5.0%.

What is claimed is:

1. A catalyst component for polymerizing olefins which comprises:

Component (A) which is a metallocene compound of a transition metal;

Component (B) which is a particulate phyllosilicate mixture comprising 0.1 to 50% by weight, based on the phyllosilicate mixture a phyllosilicate of the smectite group and a phyllosilicate of the mica group; and optionally Component (C), an organoaluminum compound.

2. The catalyst component of claim 1, further comprising a prepolymer in an amount of 0.01 to 1,000 g, obtained by prepolymerizing an olefin in the presence of said catalyst.

3. The catalyst component for polymerizing olefins as claimed in claim 1, wherein the particulate phyllosilicate mixture further meets the requirements that:

(a) the average particle diameter is 20 to 1000 μm with no more than 20% of the total number of the particles being accounted for by particles having a particle diameter of not more than 10 μm;

(b) the crushing strength of the particle is not less than 0.5 MPa as measured with a microcompression tester; and (c) the bulk density/ of the particulate phyllosilicate mixture is not less than 0.6 g/cm$^3$.

4. The catalyst component for polymerizing olefins as claimed in claim 1, wherein the phyllosilicate of the mica group of Component (B) is ion-exchangeable.

5. The catalyst component for polymerizing olefins as claimed in claim 1, wherein the particulate phyllosilicate mixture of Component (B) is such that the phyllosilicate of the mica group has not less than 30% of the exchangeable cations exchanged with a cation of an element of Groups 2 to 14 of Periodic Table or H$^+$.

6. The catalyst component for polymerizing olefins as claimed in claim 1, wherein the particulate phyllosilicate mixture of Component (B) has not less than 30% of all the exchangeable cations contained therein exchanged with a cation of an element of Groups 2 to 14 of Periodic Table.

7. The catalyst component for polymerizing olefins as claimed in claim 1, wherein the particulate phyllosilicate of the smectite group of Component (B) has an average particle size of 0.01 μm to 50 μm.

8. The catalyst component for polymerizing olefins as claimed in claim 1, wherein the phyllosilicate of the smectite group of Component (B) is montmorillonite.

9. The catalyst component for polymerizing olefins as claimed in claim 1, wherein the phyllosilicate of the smectite group of Component (B) is hectorite.

10. The catalyst component for polymerizing olefins as claimed in claim 2, wherein the prepolymerization is such that the polyolefin prepolymerized is polyethylene, the weight average molecular weight of which is not less than 30,000.

11. A catalyst for polymerizing olefins which comprises the catalyst component as claimed in claim 1 in combination with Component (C) which is an organoaluminum compound.

* * * * *